United States Patent
Mizoguchi

(10) Patent No.: US 9,254,525 B2
(45) Date of Patent: Feb. 9, 2016

(54) SHRINK FIT TOOL HOLDER

(75) Inventor: Haruki Mizoguchi, Ikoma (JP)

(73) Assignee: MST Corporation, Nara (JP)

(*) Notice: Subject to any disclaimer, the term of this patent is extended or adjusted under 35 U.S.C. 154(b) by 172 days.

(21) Appl. No.: 14/239,805

(22) PCT Filed: Aug. 3, 2012

(86) PCT No.: PCT/JP2012/069807
§ 371 (c)(1),
(2), (4) Date: Feb. 20, 2014

(87) PCT Pub. No.: WO2013/027558
PCT Pub. Date: Feb. 28, 2013

(65) Prior Publication Data
US 2014/0210169 A1    Jul. 31, 2014

(30) Foreign Application Priority Data

Aug. 22, 2011   (JP) .................................. 2011-180671

(51) Int. Cl.
*B23B 31/113* (2006.01)
*B23B 31/117* (2006.01)
*B23B 31/00* (2006.01)

(52) U.S. Cl.
CPC ........... *B23B 31/1179* (2013.01); *B23B 31/005* (2013.01); *B23B 31/008* (2013.01);
(Continued)

(58) Field of Classification Search
CPC .............. B23B 31/113; B23B 31/1179; B23B 2240/28; Y10T 279/17863; Y10T 279/17957
USPC ............................................... 279/86, 89, 97
See application file for complete search history.

(56) References Cited

U.S. PATENT DOCUMENTS

| 271,143 A | * | 1/1883 | Smith | .................... F16B 7/182 211/183 |
| 965,131 A | * | 7/1910 | Bliss | ...................... B23B 31/02 279/89 |

(Continued)

FOREIGN PATENT DOCUMENTS

| JP | 53-139683 | 11/1978 |
| JP | 05-026264 | 2/1993 |

(Continued)

OTHER PUBLICATIONS

International Search Report issued Sep. 25, 2012 in International (PCT) Application No. PCT/JP2012/069807.

(Continued)

*Primary Examiner* — Eric A Gates
(74) *Attorney, Agent, or Firm* — Wenderoth, Lind & Ponack, L.L.P.

(57) ABSTRACT

A tool holder has a chuck portion with a retaining bore in which a cutting tool can be inserted. The tool has flat surfaces extending from its end, and a circumferential groove at rear ends of the flat surfaces. When the tool is inserted into the retaining bore, first protrusions of the tool holder pass through spaces between the flat surfaces and the inner wall of the retaining bore and fitted in the groove. When the tool is turned, the protrusions move in and engage the side edges of the groove, thus preventing the tool from pulling out of the chuck portion. When the first protrusions are fitted in the groove, second protrusions of the tool holder are located on the flat surfaces. When the tool is turned, the second protrusions are received in ends of the respective spaces, thereby preventing rotation of the tool relative to the chuck portion.

4 Claims, 19 Drawing Sheets

(52) U.S. Cl.
CPC ......... *B23B31/113* (2013.01); *B23B 2231/026* (2013.01); *B23B 2231/0256* (2013.01); *B23B 2240/28* (2013.01); *Y10T 279/17863* (2015.01); *Y10T 279/17957* (2015.01)

(56) References Cited

U.S. PATENT DOCUMENTS

| | | | | |
|---|---|---|---|---|
| 1,413,280 | A * | 4/1922 | Kengel | ................... B23B 31/113 279/76 |
| 1,424,743 | A * | 8/1922 | Smith | ................... B23B 31/113 279/89 |
| 1,809,553 | A * | 6/1931 | Graul | ..................... B21D 28/34 279/89 |
| 2,540,937 | A * | 2/1951 | Edens | ................... B23B 31/113 279/76 |
| 2,731,273 | A * | 1/1956 | Edens | ................... B23B 31/113 279/81 |
| 2,801,860 | A * | 8/1957 | Getts | ..................... B23B 31/113 279/23.1 |
| 3,679,220 | A * | 7/1972 | Reeves | ................. B23B 31/113 279/89 |
| 5,597,275 | A * | 1/1997 | Hogan | .................. B23B 31/005 279/89 |
| 6,390,739 | B1 * | 5/2002 | O'Banion | ............. B23B 31/113 279/24 |
| 8,033,766 | B2 * | 10/2011 | Erickson | ............. B23B 31/1077 279/67 |
| 2003/0075879 | A1 | 4/2003 | Lundblad et al. | |
| 2010/0061820 | A1 * | 3/2010 | Haimer | ................... B23B 31/02 408/143 |

FOREIGN PATENT DOCUMENTS

| | | |
|---|---|---|
| JP | 05-126170 | 5/1993 |
| JP | 2001-150221 | 6/2001 |
| JP | 2002-355727 | 12/2002 |
| JP | 2003-517940 | 6/2003 |
| JP | 3932216 | 6/2007 |
| JP | 2009-045716 | 3/2009 |
| JP | 2009-533234 | 9/2009 |

OTHER PUBLICATIONS

Written Opinion of the International Searching Authority issued Sep. 25, 2012 in International (PCT) Application No. PCT/JP2012/069807 (with English translation).

* cited by examiner

Fig.19
(a)
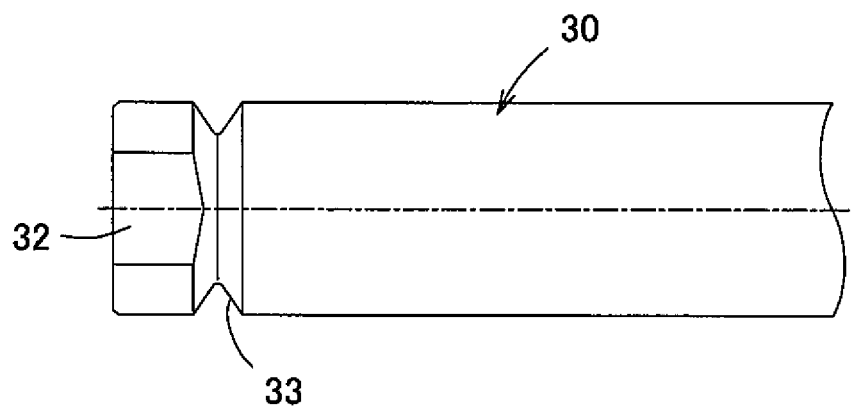
(b)
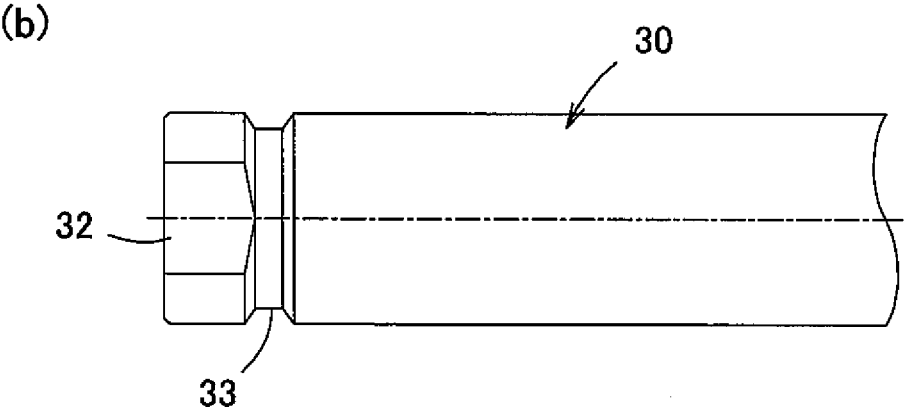

SHRINK FIT TOOL HOLDER

TECHNICAL FIELD

This invention relates to a shrink fit tool holder which can be detachably mounted to a machine tool such as a machining center.

BACKGROUND ART

As shown in FIG. 1, which shows one embodiment of the present invention, a tool holder A used to mount a cutting tool on a machining center includes a shank portion 1 which can be detachably mounted to a spindle of a machining center, and a chuck portion 2 fixed to the shank portion 1 through a grip portion 3 to be gripped by a manipulator.

Since today's spindles are rotated at increasingly high speeds, it is for example required that tool holders be capable of gripping a cutting tool 30 strongly and with high accuracy, have sufficient rigidity, rotatable in a balanced manner. Among tool holders that meet these requirements are known as shrink fit tool holders, in which the cutting tool 30 is fitted in the chuck portion 2 by shrink fitting (which are disclosed in the below-identified Patent documents 1 to 4).

Due to recent advanced technology, increasing numbers of parts made of materials which are difficult to cut, such as aluminum alloys and titanium alloys, are used in aerospace, motor-related and other industries. These parts include aluminum structural parts such as airframes, wing ribs and bulkheads of aircraft, titanium structural parts such as air frame components and edge frame, and blades and impellers of motors.

Spindles of machine tools (machining centers) used to efficiently machine or cut these difficult-to-cut materials are rotated at as high as 33000 rpm or over, with the output of the spindle motors at as high as 80 kW (100 HP) or over, in machining aluminum, and the spindle torque could reach 1500 Nm in machining titanium. Machining centers capable of withstanding such high loads are now commercially available.

Since conventional machining centers having three axes (capable of moving up and down, right and left, and back and forth) are low in machining efficiency, 5-axis control machining centers, which have two rotation center axes (A- and B-axes) in addition to the above three axes, are now increasingly frequently used.

During machining of such difficult-to-cut materials, especially using a 5-axis control machining center, especially high gripping force (gripping torque) is required for the cutting tool holder.

The gripping force is the force which receives and withstands cutting loads applied to the cutting tool 30 during cutting. The larger this gripping force, the higher the cutting efficiency. In other words, the larger the gripping force (gripping torque) of the tool holder, the higher the cutting ability is, and the smaller the gripping force, the lower the cutting ability. For higher efficiency, it is also required that the tool holder have high rigidity (due e.g. to a large diameter of its grip portion, and its short effective length) and the cutting tool also have high rigidity (due e.g. to a short length of its protruding portion and due to the fact that it is made of cemented carbide). The gripping force is important because the larger the gripping force, the deeper it is possible to cut the material at a higher feed rate, which means that the higher the gripping force, the higher the machining efficiency, which significantly influences productivity and costs.

When machining aluminum, the higher the cutting speed is, the higher the cutting efficiency tends to be. Since aluminum is lower in strength than steel, it can be cut deeper. Thus, when machining aluminum, the depth of cut is set at a larger value. But if the depth of cut is large, the tool holder and the cutting tool tend to chatter (vibrate) violently. Violent chattering (vibration) of the tool holder and the cutting tool could easily cause slippage between the tool holder and the cutting tool, even if the gripping force is considered to be sufficient. Such slippage could result in the cutting tool being pulled out of the tool holder.

On the other hand, titanium is high in mechanical strength, low in thermal conductivity (and thus heat dissipation), high in affinity for other metals, and can easily react with oxygen and nitrogen, so that titanium is classified as a difficult-to-cut material. Titanium generates peculiar serration-shaped chips due to fluctuations in cutting force. Due to fluctuations in cutting force, violent "chattering" occurs, which causes premature wear of the cutting tool. The worn cutting tool increases cutting torque, which could in turn causes slippage of the cutting tool or the cutting tool to be pulled out of the tool holder.

Parts for aircraft are frequently manufactured by cutting a huge material to be cut. Such material to be cut is expensive and if parts are excessively cut due to separation of the cutting tool, it is impossible to repair such excessively cut parts, resulting in immense loss.

Thus, it is an ordinary practice to increase safety standards and reduce the standards for machining conditions. But this makes it impossible to perform machining with high efficiency expected for such machining.

As explained above, since shrink fit tool holders can cope with high-speed rotation of spindles, can grip the cutting tool 30 with high accuracy and with high strength, are rigid, and allows the cutting tool to be rotated in a balanced manner, slender and tapered shrink fit holders are frequently used in the mold manufacturing field, especially during deep carving. This is mainly because by using such a holder, the holder is less likely to interfere with the workpiece, so that it is possible to use a relatively short cutting tool, which increases the rigidity of the cutting tool, thereby improving the machining accuracy and increasing the life of the cutting tool (see Patent document 1).

But in the fields of high-efficiency machining of aluminum and machining of difficult-to-cut materials such as titanium, including the aircraft-related fields, such tapered shrink fit holders are not considered to be as satisfactory as used in the mold manufacturing field.

PRIOR ART DOCUMENTS

Patent Documents

Patent document 1: JP Patent Publication 2009-45716A
Patent document 2: JP Patent Publication 2009-533234A
Patent document 3: JP Patent Publication 2001-150221A
Patent document 4: JP Patent 3932216B
Patent document 5: JP Patent Publication 05-26264A
Patent document 6: JP Patent Publication 05-126170A

SUMMARY OF THE INVENTION

Object of the Invention

In high-efficiency machining of aluminum alloys and titanium in e.g. the above-described aerospace and motor-related industries, it is necessary to minimize the total length of the tool holder, to minimize the length of the portion of the cutting tool protruding from the tool holder, and to positively prevent the cutting tool from being pulled out of the tool holder.

The gripping force with which the holder grips the cutting tool is more than ten times the cutting torque and nearly 30 times the pulling component. The cutting tool could move in the axial direction or circumferential (rotational) direction relative to the holder due to bending moment applied to the fulcrum of the cutting tool. Thus, in order to increase the gripping force of the holder, it is important to prevent the cutting tool from being pulled out of the holder and to prevent rotation of the cutting tool relative to the holder.

In order to prevent the cutting tool from being pulled out of the holder and to prevent rotation of the cutting tool relative to the holder, Patent document 2 proposes to fit balls protruding from the outer peripheral surface of the holder into the retaining bore for the cutting tool in a circumferential groove formed in the outer peripheral surface of the insert portion of the cutting tool (see FIGS. 1 to 22 of Patent document 2).

For the same purpose, Patent document 3 proposes to engage a protrusion formed on the insert end of the cutting tool in a groove formed in the inner end of the retaining bore of the holder to prevent rotation of the cutting tool relative to the holder (see FIG. 8 of Patent document 3).

But in the anti-pull-out and anti-rotation means of Patent document 2, since the width of the groove is substantially equal to the diameter of the balls, when the cutting tool is inserted into the retaining bore of the holder, it is difficult to smoothly guide the balls into the groove through its opening. Also, since the groove is a bent groove having an axially extending portion, when the cutting tool is rotated relative to the holder, the balls cannot be moved smoothly in the groove. Further, since the cutting tool is aligned with respect to the holder by bringing the insert end of the tool into abutment with the inner end of the retaining bore of the holder (as shown in FIG. 12 of Patent document 2), the balls are located at intermediate portions of the groove are thus are movable, so that this arrangement cannot sufficiently prevent rotation and separation of the cutting tool. It is also not easy to form a groove bent in the axial direction in the outer peripheral surface of the cutting tool.

In Patent document 3, in which the protrusion formed on the insert end of the cutting tool is engaged in the groove formed in the inner end of the retaining bore of the holder to prevent rotation of the cutting tool, when the cutting tool is inserted into the retaining bore of the holder, the protrusion cannot be smoothly fitted in the groove. The tool holder of Patent document 3 has no function of preventing the cutting tool from being pulled out of the holder.

Therefore, a first object of the present invention is to provide a different means for preventing the cutting tool from being pulled out of the tool holder; a second object is to provide a different means for preventing rotation of the cutting tool relative to the tool holder; a third object is to achieve the above two means easily.

Means for Achieving the Object

According to the present invention, in order to achieve the first object, instead of the above-described bent groove, flat surfaces lying on planes extending in the axial direction of the cutting tool is formed on the outer peripheral surface of the insert portion of the cutting tool, and protrusions are formed on the inner wall of the retaining bore of the holder such that the protrusions can move in the axial direction through spaces defined between the respective flat surfaces and the inner wall of the retaining bore while sliding on the flat surfaces, until the protrusions are received in a groove continuous with the flat surfaces and extending in the circumferential direction of the cutting tool.

The retaining bore of the holder is cylindrical in shape while the insert portion of the cutting tool is columnar in shape. Thus, when the cutting tool is inserted into the retaining bore, a space having a crescent section is defined between the respective flat surfaces and the inner wall of the retaining bore. Since these spaces are wide, one can easily recognize the angular relationship between the protrusions and the opening edges of the respective spaces. Thus, it is possible to easily turn the cutting tool to the position where the protrusions are located at the centers of the respective spaces. When, thereafter, the protrusions are received in the groove, the cutting tool is turned about its axis relative to the chuck portion to move the protrusions in the length direction of the groove until the protrusions engage the side edges of the groove. Due to this engagement, the cutting tool is prevented from being pulled out of the chuck portion.

In a specific arrangement for achieving the first object, the present invention provides a shrink fit tool holder comprising a shank portion which can be detachably mounted to a machine tool, and a chuck portion configured to hold a cutting tool by shrink fitting and formed with a cylindrical retaining bore, wherein the cutting tool comprises a columnar insert portion which can be inserted into the retaining bore and has an outer peripheral surface formed with flat surfaces lying on planes extending in the axial direction of the cutting tool, and extending from the distal end of the insert portion of the cutting tool, and with a groove continuous with the flat surfaces and extending in the circumferential direction of the cutting tool, wherein anti-pull-out protrusions are provided on the inner wall of the retaining bore, wherein the tool holder is configured such that when the cutting tool is inserted into the retaining bore, the anti-pull-out protrusions can pass through spaces defined between the respective flat surfaces and the inner wall of the retaining bore and can be received in the groove, and when, thereafter, the cutting tool is turned about an axis of the cutting tool relative to the chuck portion, the anti-pull-out protrusions move in the length direction of the groove until the anti-pull-out protrusions engages the side edges of the groove, thereby preventing the cutting tool from being pulled out of the chuck portion.

In this arrangement, the length of the flat surfaces is determined such that the protrusions are received in the groove before the insert end of the tool reaches the inner end of the retaining bore, or such that the protrusions are received in the groove simultaneously when the insert end of the tool reaches the inner end of the retaining bore. In the former case, the tool is axially positioned relative to the chuck portion by the protrusions being received in the groove. In the latter case, the tool is axially positioned relative to the chuck portion by the insert end of the tool abutting the inner end of the retaining bore.

The groove may not extend the entire circumference but have circumferential ends. In this case, when the cutting tool is turned in the direction opposite to the cutting direction until one of the protrusions abuts one circumferential end, the cutting tool is prevented from rotating relative to the holder. If the groove is designed such that its depth gradually decreases toward the one circumferential end, the protrusion is more tightly pressed against the inner wall of the groove as it moves toward the one circumferential end, thus preventing rattling of the cutting tool, while simultaneously preventing rotation of the cutting tool. If it is not necessary to prevent rotation of the cutting tool, it is not necessary to bring the protrusion into engagement with the circumferential end of the groove.

The anti-pull-out protrusions and the groove may e.g. have semicircular or triangular sections along a plane perpendicular to the length direction of the groove, and preferably have identical sectional shapes taking into consideration the fitting tolerance. If the protrusions and the groove have identical sectional shapes, the protrusions can be snugly fitted in the groove. This prevents rattling of the cutting tool.

The cutting tool is inserted into the retaining bore until its distal end reaches the inner end of the bore. The retaining bore is ordinarily formed only in the chuck portion, but may extend into the shank portion.

In order to achieve the first object, the present invention also provides a shrink fit tool holder comprising a shank portion which can be detachably mounted to a machine tool, and a chuck portion configured to hold a cutting tool by shrink fitting; wherein a stopper is screwed to the end surface of the chuck portion from which the cutting tool is inserted into the retaining bore so as to engage a groove of the cutting tool so that the stopper prevents the cutting tool from being pulled out of the chuck portion; or wherein an external thread or an internal thread is formed on the end of the retaining bore of the chuck portion from which the cutting tool is inserted into the bore so as to threadedly engage an internal thread or an external thread formed on the insert end of the cutting tool, thereby preventing the cutting tool from being pulled out of the chuck portion, and also preventing rotation of the cutting tool relative to the chuck portion.

If the direction of the threads is the direction opposite to the cutting direction, the threads can also prevent rotation of the cutting tool.

According to the present invention, in order to achieve the second object, in the same manner as above, instead of the above-described bent groove, flat surfaces lying on planes extending in the axial direction of the cutting tool is formed on the outer peripheral surface of the insert portion of the cutting tool, and protrusions are formed on the inner wall of the retaining bore of the holder such that the protrusions are positioned in spaces defined between the respective flat surfaces and the inner wall of the retaining bore.

The retaining bore of the holder is cylindrical in shape while the insert portion of the cutting tool is columnar in shape. Thus, when the cutting tool is inserted into the retaining bore, spaces having a crescent section are defined between the respective flat surfaces and the inner wall of the retaining bore. With the protrusions located in the respective spaces, when the cutting tool is rotated relative to the holder, the protrusions are received in corresponding ends of the crescent spaces defined between the inner wall of the retaining bore and the respective flat surfaces of the tool, thereby effectively preventing rotation of the tool. When the protrusions are received in corresponding ends of the spaces, the protrusions also serve, to a significant degree, to prevent the cutting tool from being pulled out of the holder, and also press the cutting tool, thereby effectively preventing rattling of the cutting tool.

Preferably, the anti-rotation protrusions have a triangular section along a plane perpendicular to the axial direction of the cutting tool such that the apex of the triangular section is directed at the axis of the cutting tool. With this arrangement, when the cutting tool is rotated about its axis relative to the chuck portion, the anti-rotation protrusions are received in corresponding ends of the crescent spaces defined between the inner wall of the retaining bore and the respective flat surfaces of the tool, thereby more effectively preventing rotation of the cutting tool. Preferably, the ends of each triangular protrusion are preferably identical in shape to the ends of the crescent space (as shown in FIG. 4) so that the protrusions can be each more reliably received in either end of the space.

In one specific arrangement for achieving the second object, the present invention provides a shrink fit tool holder comprising a shank portion which can be detachably mounted to a machine tool, a chuck portion configured to hold a cutting tool by shrink fitting and formed with a cylindrical retaining bore, wherein the cutting tool comprises a columnar insert portion which can be inserted into the retaining bore and has an outer peripheral surface formed with flat surfaces lying on planes extending in the axial direction of the cutting tool, and extending from the distal end of the insert portion of the cutting tool, wherein anti-rotation protrusions are provided on the inner wall of the retaining bore, wherein the tool holder is configured such that when the cutting tool is inserted into the retaining bore, the anti-rotation protrusions enter spaces defined between the respective flat surfaces and the inner wall of the retaining bore, and when, thereafter, the cutting tool is turned about the axis of the cutting tool relative to the chuck portion, the anti-rotation protrusions are moved around the axis of the tool and is received in ends of the spaces, thereby preventing rotation of the cutting tool relative to the chuck portion.

In another arrangement for achieving the second object, the present invention provides a shrink fit tool holder comprising a shank portion which can be detachably mounted to a machine tool, and a chuck portion configured to hold a cutting tool by shrink fitting and formed with a retaining bore, wherein a circumferentially extending one-way clutch provided on the inner wall of the retaining bore of the chuck portion, wherein the tool holder is configured such that when the cutting tool is inserted into the retaining bore, rollers of the one-way clutch abut the outer peripheral surface of insert portion of the cutting tool, whereby the one-way clutch permits rotation of the cutting tool relative to the chuck portion in the direction opposite to the cutting direction.

With this arrangement, the cutting tool is also prevented from being pulled out of the holder by the engagement of the rollers of the one-way clutch.

This arrangement for achieving the second object can also be used to achieve the first object. For example, in the arrangement in which the anti-pull-out protrusions, one-way clutch or stopper is provided, or in the arrangement in which the cutting tool is in threaded engagement with the chuck portion, the anti-rotation protrusions may be further formed on the inner wall of the retaining bore of the chuck portion such that when the anti-pull-out protrusions are fitted in the groove, the anti-rotation protrusions are located on the respective flat surfaces, and such that the when, thereafter, the cutting tool is turned about its axis relative to the chuck portion, the anti-rotation protrusions are received in corresponding ends of the spaces defined by the respective flat surfaces and the inner wall of the retaining bore, thereby preventing rotation of the cutting tool relative to the chuck portion.

Further alternatively, to achieve the second object, a conventional side locking mechanism may be used. For example, the present invention provides a shrink fit tool holder comprising a shank portion which can be detachably mounted to a machine tool, and a chuck portion configured to hold a cutting tool by shrink fitting and formed with a cylindrical retaining bore, wherein the cutting tool comprises a columnar insert portion which can be inserted into the retaining bore and has an outer peripheral surface formed with flat surfaces lying on planes extending in the axial direction of the cutting tool, and extending from the distal end of the insert portion of the cutting tool, wherein anti-rotation protrusions are provided on the inner wall of the retaining bore of the chuck portion, and side pins are provided to extend from the outer peripheral surface of the chuck portion into the retaining bore, wherein the tool holder is configured such that when the cutting tool is inserted into the retaining bore until the anti-rotation protrusions are located on the respective flat surfaces, and then the cutting tool is turned about its axis relative to the chuck portion, the anti-rotation protrusions are received in ends of the respective spaces, thereby preventing rotation of the cutting tool relative to the chuck portion, and wherein in this state, the side pins can be driven in until the side pins abut a recess formed on the outer peripheral surface of the cutting tool, thereby preventing the cutting tool from being pulled out of the chuck portion.

In any of the above-described arrangements, either of the anti-rotation protrusions and the anti-pull-out protrusions, or either of the anti-pull-out protrusions and the one-way clutch may be provided forwardly of the others relative the axial direction of cutting tool. If the anti-pull-out protrusions are provided rearwardly (closer to the end of the retaining bore from which the cutting tool is inserted), it is provided rearwardly of the groove or the one-way clutch such that the flat surfaces extend to this position.

The protrusions may have triangular or semicircular sections as described, or may have any other shape. The protrusions can be formed in any of many different manners. For example, the protrusions may be directly formed on the inner wall or inner end surface of the retaining bore by e.g. cutting, welding or fitting. Otherwise, the anti-rotation protrusions may be in the form of pins inserted from the outer peripheral surface of the chuck portion into the respective spaces until the pins abut the flat surfaces, thereby preventing rotation of the cutting tool relative to the chuck portion. In this arrangement, the flat surfaces preferably extend in the axial directions of the respective pins (as shown in FIGS. 11 to 17) so that the pins can be easily inserted into the above spaces.

In order to achieve the third object, according to the present invention, the shank portion and the chuck portion are formed as separate members and the separate members are joined together by e.g. friction welding, TIG welding or electron beam welding. But electron beam welding is preferable because it offers strong welding and is suitable for mass-production, and the shank portion and the chuck portion can be joined together with high accuracy so that the axes of the shank portion and the chuck portion are scarcely inclined or offset relative to each other.

Since the protrusions are formed deep in the retaining bore, if the shank portion and the chuck portion are portions of an integral body, the protrusions have to be formed by inserting a cutting tool from the opening of the retaining bore, which is located at the end of the chuck portion and thus far apart from the protrusions. It is therefore troublesome to form the protrusions, and also, it is difficult to form such protrusions with high accuracy. In contrast, by forming the chuck portion and the shank portion from separate members, it is possible to form the protrusions by inserting a tool from one of the openings of the retaining bore formed in the fitting surfaces of the separate members, which are located far closer to the protrusions. Thus, the protrusions can be formed easily and accurately.

When joining two members together, the two members are frequently joined together before performing any necessary treatment or after pre-treatment. But according to the present invention, for the above-mentioned reason, the two separate members have to be joined together after forming, finishing and heat-treating the groove and protrusions, the two separate members are preferably joined together by high-precision welding such as electron beam welding.

The fitting surfaces of the two split members are preferably located as close to the protrusions as possible so that the protrusions can be formed easily by inserting a tool from this opening. If both the anti-pull-out protrusions, which are to be fitted in the circumferential groove, and the anti-rotation protrusions are formed, the tool holder should be split into the two separate members at a position between the anti-pull-out protrusions and the anti-rotation protrusions. With this arrangement, since the anti-pull-out protrusions and the anti-rotation protrusions are formed, respectively, on one and the other of the shank portion and the chuck portion, the protrusions can be formed easily. Either of the anti-pull-out protrusions and the anti-rotation protrusions are ordinarily formed by leaving an annular rib when forming the retaining bore and removing the portions of the annular rib other than its portions to be formed into the protrusions. If all of these protrusions are to be formed on one of the two separate members, when forming the deeper ones of the protrusions, the other protrusion will be an obstacle and make it difficult to form the deeper ones of the protrusions. The one-way clutch can be fitted in position more easily from the fitting surface of one of the separate members than from the end surface of the retaining bore from which the cutting tool is inserted.

Since a shrink fit tool holder allows balanced rotation of the cutting tool, it is preferable to arrange the protrusions, flat surfaces, groove, one-way clutch, stopper and/or pins, which are all not present in conventional arrangements, so as to be balanced in weight, size and intervals with respect to the circumferential direction and thus not to deteriorate the balance of rotation.

Advantages of the Invention

According to the present invention, new means for preventing the cutting tool from being pulled out of the chuck portion and for preventing rotation of the cutting tool relative to the chuck portion can be easily manufactured.

BRIEF DESCRIPTION OF THE DRAWINGS

FIG. 3(*b*) is a plan view thereof; and FIG. 3(*c*) is a left-hand side view thereof.

FIG. 6(*b*) is a sectional view taken along line X-X of FIG. 6(*a*).

FIG. 8(*b*) is a right-hand side view thereof; FIG. 8(*c*) is a front view of a cutting tool thereof; and FIG. 8(*d*) is a partial sectional view of a tool holder thereof, showing the state in which the cutting tool is mounted.

FIGS. 19(a) and 19(b) are plan views of cutting tools formed with different anti-pull-out grooves.

FIGS. 21(a) and 21(b) show how cutting is performed using the cutting tool of FIGS. 20(a) to 20(d), of which FIG. 21(a) shows an initial stage of insertion of the cutting tool, and FIG. 21(b) shows after the cutting tool has been turned.

BEST MODE FOR EMBODYING THE INVENTION

Figure 1:
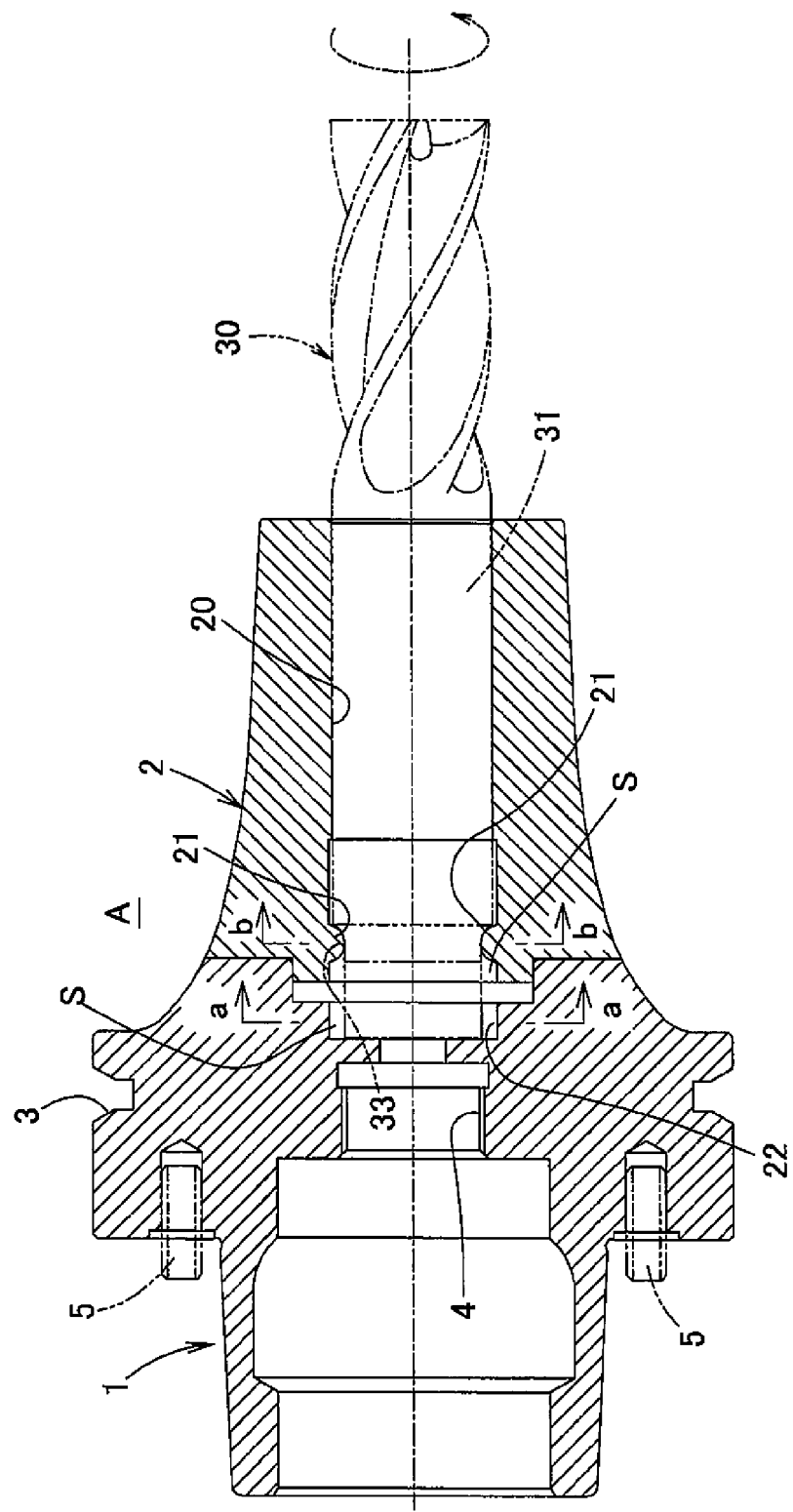
FIG. 1 is a sectional front view of an embodiment of the present invention.

FIGS. 1 to 4 show a tool holder A embodying the present invention which includes a shank portion 1 detachably mounted to a spindle of a machining center, and an inverted conical chuck portion 2 which is fixedly coupled to the shank portion 1 through a grip portion (V-flange portion) 3 to be gripped by a manipulator for an automatic tool changer (ATC).

The shank portion 1 and the grip portion 3 form an integral shank body, which is a separate member from the chuck portion 2. The integral shank body and the chuck portion 2 have respective fitting surfaces along which the shank body and the chuck portion 2 are joined together. A cylindrical fitting protrusion is formed on the fitting surface of the chuck portion 2, while a cylindrical fitting recess is formed in the fitting surface of the integral shank body such that a gap exists between the end surface of the cylindrical fitting protrusion and the inner end surface of the cylindrical fitting recess. The chuck portion 2 and the integral shank portion are joined together by electron beam welding. But conversely, the cylindrical fitting protrusion and the cylindrical fitting recess may be formed on and in the fitting surfaces of the integral shank body and the chuck portion 2, respectively.

A cylindrical retaining bore 20 for retaining a cutting tool 30 extends from the distal end of the chuck portion 2 (right-hand end in FIG. 1) into the grip portion 3 (to be gripped by a manipulator) and has a center axis which coincides with the center axis of the tool holder.

The retaining bore 20 has a minimum diameter (diameter of the opening of the bore 20 at the distal end of the chuck portion 2) which is slightly smaller than the diameter of the cutting tool 30 at its insert portion 31 to be inserted into and gripped by the chuck portion 2 such that the cutting tool 30 is rigidly fixed in position in the chuck portion 2 by shrink fitting, in which the cutting tool 30 is inserted into the retaining bore 20 with the chuck portion 2 thermally expanded (and its retaining bore 20 radially expanded) by heating, and then the chuck portion 2 is allowed to cool down. In order to rigidly fix the cutting tool in position by shrink fitting, the chuck portion 2 (as well as the shank portion 1 and the grip portion 3 (to be gripped by a manipulator) is made e.g. of a material disclosed in Patent document 4.

Two anti-pull-out protrusions 21 are provided on the inner wall of the portion of the retaining bore 20 formed in the chuck portion 2 at its portion near the fitting surface of the chuck portion 2 so as to be symmetrical to each other with respect to the axis of the chuck portion 2. The protrusions 21 are formed first by forming a rib extending the entire circumference of the bore 20 and having a semicircular cross-section, and then removing portions of the rib between its portions to be formed into the protrusions. The thus formed protrusions 21 have apexes extending in a straight line in the direction perpendicular to the axial direction of the cutting tool and have a semicircular cross-section. The number of such protrusions 21 may be three, four or more, provided such protrusions 21 are circumferentially equidistantly spaced apart from each other around the axis, and are equal in number to the number of the below-described flat surfaces 32 formed on the cutting tool 30.

Two anti-rotation protrusions 22 are provided on the inner wall of the portion of the retaining bore 20 formed in the integral shank portion (including the shank portion 2 and the grip portion 3) at its portion near its fitting surface so as to be symmetrical to each other with respect to the axis of the chuck portion (shank portion). The anti-rotation protrusions 22 have a triangular cross-section along a plane perpendicular to the axial direction of the cutting tool, and are formed in a similar manner as the protrusions 21. The number of protrusions 22 may be three, four or more, provided the protrusions 22 are circumferentially equidistantly spaced from each other around the axis, and are equal in number to the number of the flat surfaces 32. The protrusions 21 and 22 are both circumferentially equidistantly spaced from each other so that the tool holder can rotate in a balanced manner.

Figure 17:
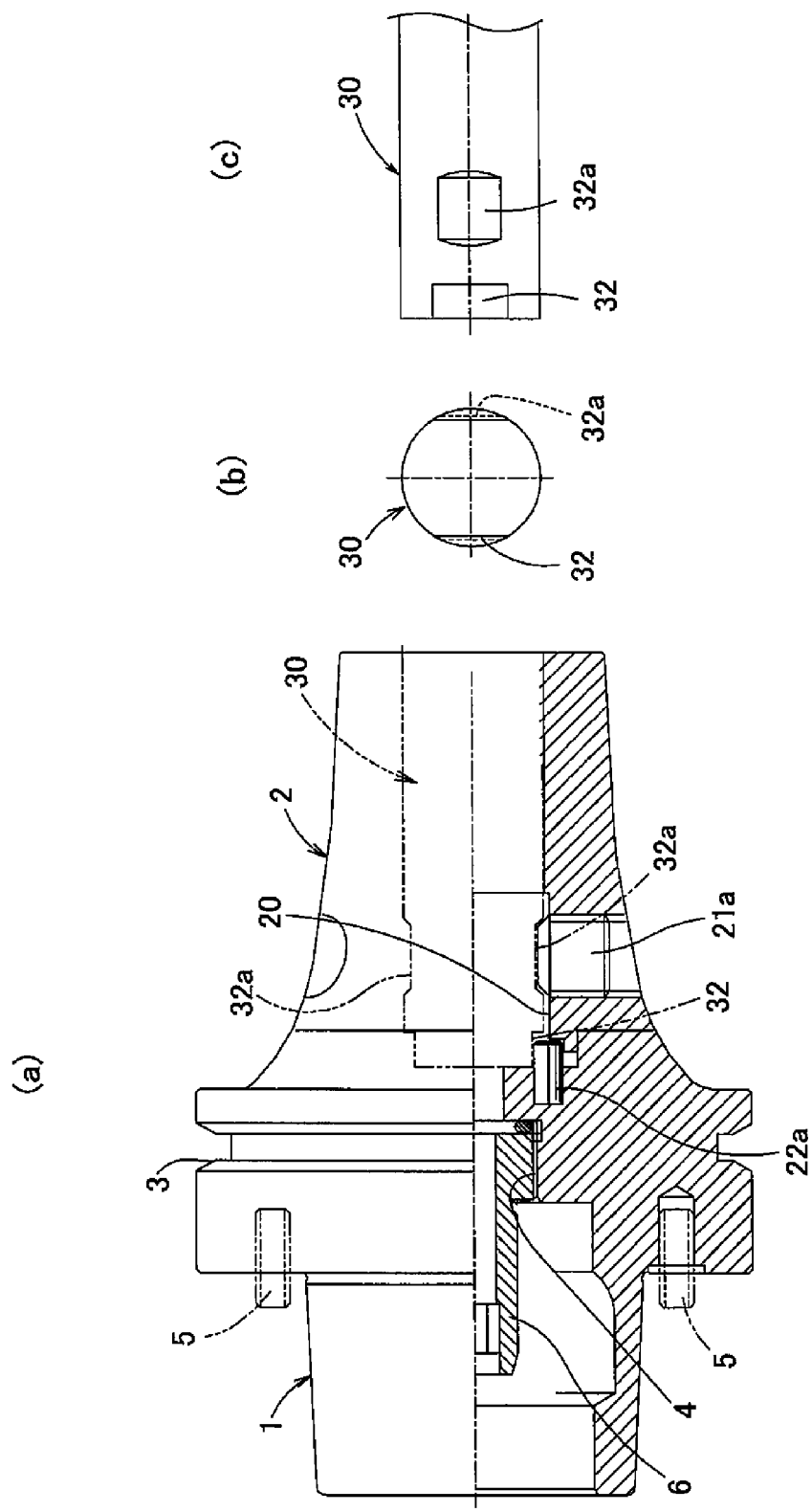
FIG. 17(a) is a partially cutaway front view of a tool holder of still another embodiment.
FIG. 17(b) is a left-hand side view of a cutting tool thereof.
FIG. 17(c) is a partial front view of the cutting tool thereof.
Figure 18:
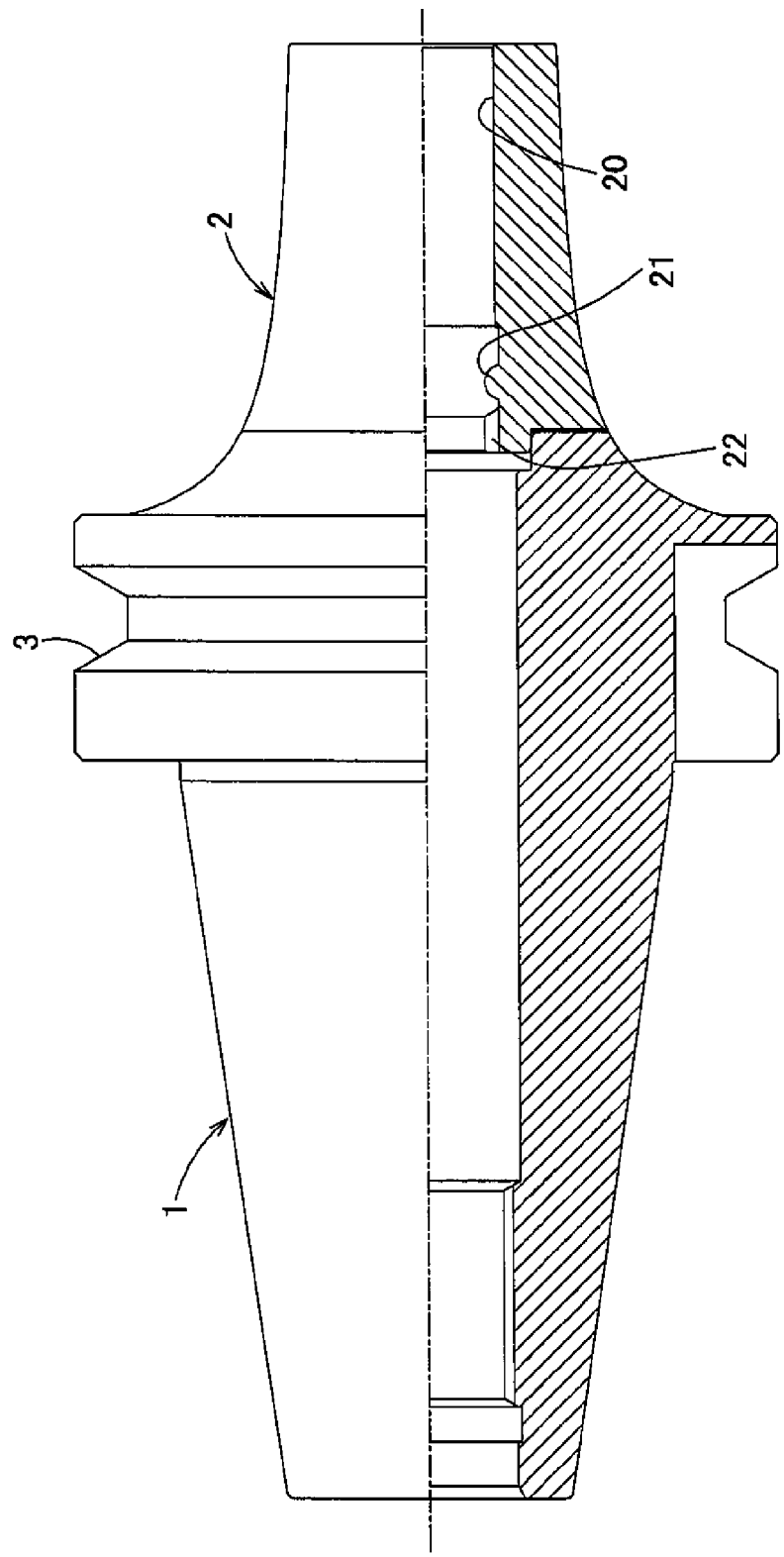
FIG. 18 is a partially cutaway front view of still another embodiment.

The protrusions 21 are circumferentially offset from the corresponding protrusions 22 by 45 degrees around the axis of the tool. The tool holder is formed with an internal thread 4 used to mount a coolant duct 6 (as shown in FIG. 17). The tool holder carries anti-slippage pins 5 configured to engage the end surface of a spindle, thereby preventing slippage (rotation) of the holder relative to the spindle.

The cutting tool 30, which is to be attached to the tool holder A of this embodiment, is an end mill having a large diameter of e.g. 12 to 32 mm. Two flat surfaces 32 are formed on the outer peripheral surface of the insert portion 31 of the cutting tool 30 to be inserted into the retaining bore 20 at its end so as to be symmetrical to each other with respect to the axis of the tool.

The flat surfaces 32 are formed by cutting the outer peripheral surface of the insert portion 31 of the cutting tool 30 along planes extending in the axial direction of the tool. Since the retaining bore 20 is cylindrical in shape, and the insert portion 31 of the cutting tool is a columnar member, spaces S having a substantially crescent section are defined between the respective flat surfaces 32 and the inner wall of the retaining bore when the insert portion 31 is inserted in the retaining bore 20. The cutting tool is further formed with a groove 33 having a semicircular cross-section and continuously and circumferentially extending along the rear ends of the flat surfaces 32, i.e. their ends closer to the distal end of the chuck portion 2 such the groove 33 is coaxial with the cutting tool 30.

Figure 2:
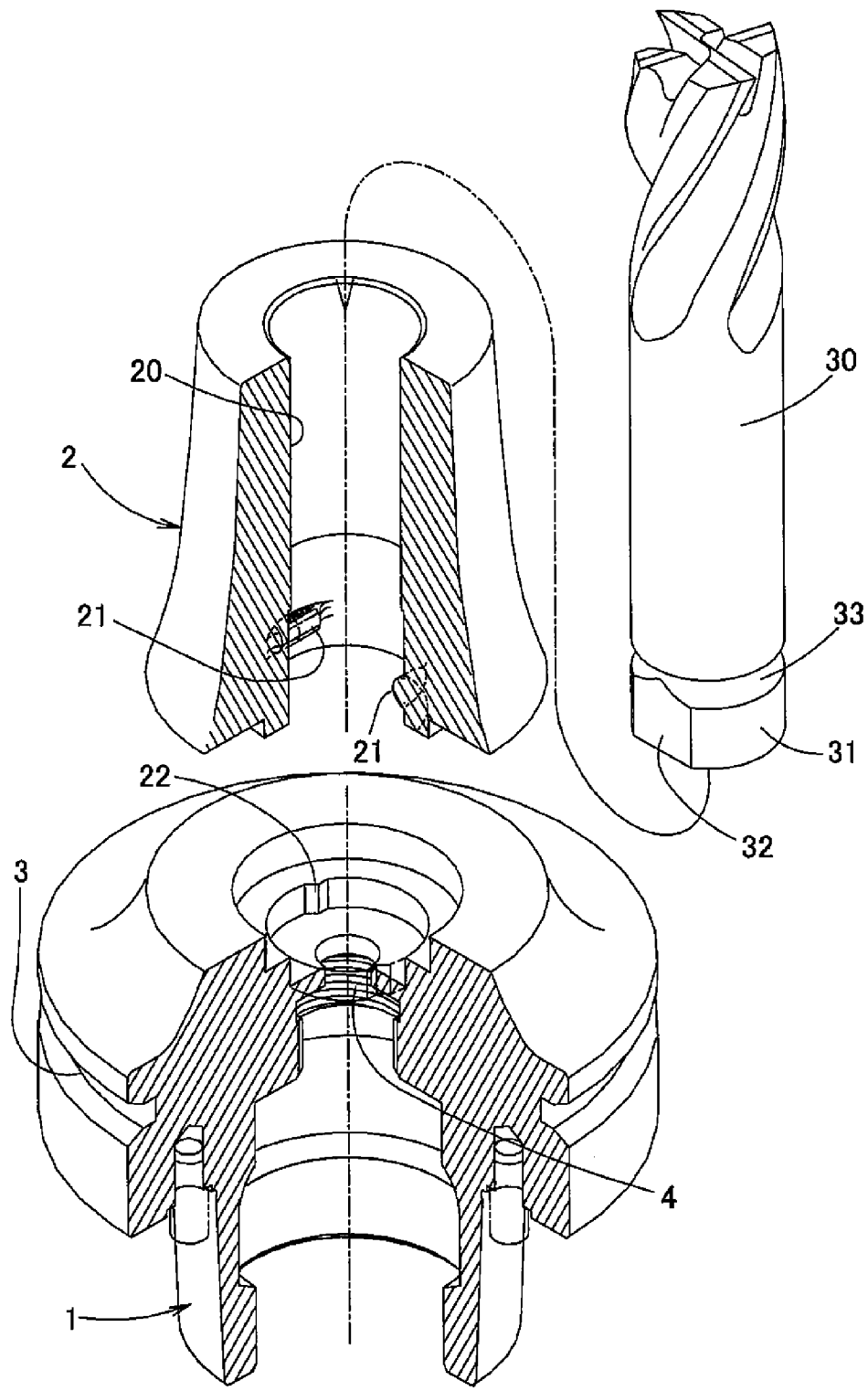
FIG. 2 is a partially cutaway exploded perspective view of the embodiment of FIG. 1.

When the cutting tool 30 is inserted into the chuck portion 2 (of the tool holder A) as shown by the arrow in FIG. 2, since the openings of the substantially crescent spaces S defined between the flat surfaces 32 and the inner wall of the retaining bore are wide, one can easily recognize the angular relationship between the protrusions 21 and the opening edges of the respective spaces. Thus, it is possible to easily turn the cutting tool 30 to the position where the protrusions 21 are located at the centers of the respective spaces S, as shown in FIG. 5(a).

While the protrusions 21 are moving along the respective flat surfaces 32, the end surface of the cutting tool insert portion reaches the protrusions 21. Since the protrusions 21 are angularly offset from the respective protrusions 22 by 45 degrees, each protrusion 22 is inserted into one end of the corresponding crescent space S. When the cutting tool is further pushed into the chuck portion, the end surface of the cutting tool insert portion abuts the deep end of the retaining bore 20. This determines the length of the portion of the cutting tool 30 protruding from the tool holder A. In this state, the protrusions 21 are snugly fitted in the groove 33 such that the protrusions 21 can move in the length direction of the groove 33 but not in the width direction of the groove (axial direction of the cutting tool 30), as shown in FIG. 1.

Since the flat surfaces 32 serve as reference surfaces when fitting and locking in position the cutting tool 30 in the tool holder A or when ejecting (removing) the cutting tool from the tool holder, symbols such as impressions are preferably provided on the end surface of the chuck portion 2 at positions corresponding to the protrusions 21 on the retaining bore 20 such that the protrusions 21 and 22 can be easily inserted into and pulled out of the spaces S.

Figure 4:
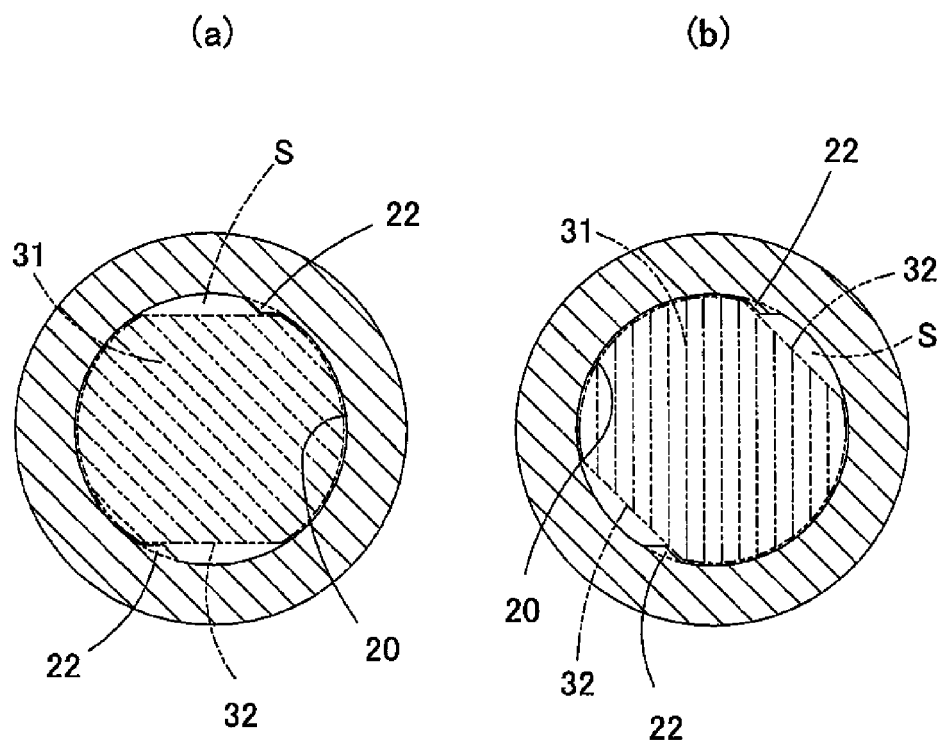
FIGS. 4(*a*) and 4(*b*) are sectional views taken along line a-a of FIG. 1, showing, respectively, an initial stage of insertion of a cutting tool, and the state after the cutting tool has been turned.
Figure 5:
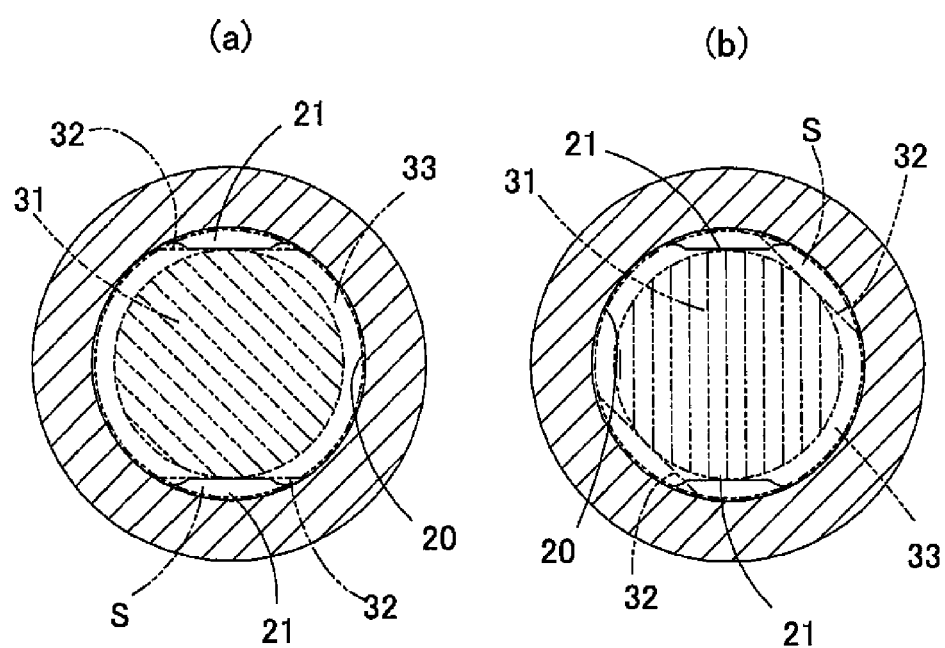
FIGS. 5(*a*) and 5(*b*) are sectional views taken along line b-b of FIG. 1, showing, respectively, an initial stage of insertion of a cutting tool, and the state after the cutting tool has been turned.

From the state shown in FIGS. 4 and 5(a), when the cutting tool 30 is turned in the direction opposite to the cutting direction (clockwise direction in these figures), the protrusions 21 are moved in the groove 33 to the position shown in FIG. 5(b). In this state, the protrusions 21 engage the side edges of the groove 33, preventing the cutting tool 30 from coming out of the retaining bore 20 of the chuck portion 2. On the other hand, the protrusions 22 move across the respective spaces S and are received in the opposite ends of the respective spaces S, as shown in FIG. 4(b), thereby preventing the cutting tool 30 from rotating in the cutting direction (rotational direction shown by the arrow in FIG. 1) relative to the chuck portion 2. With the protrusions 22 received in the other ends of the spaces S, the protrusions 22 also serve to tightly clamp the cutting tool 30, thereby preventing chattering of the cutting tool 30. Since the anti-rotation protrusions 22 are complementary in shape to the other ends of the spaces S, which have a triangular section along a plane perpendicular to the axis of the cutting tool (as seen in FIG. 4(b)), when the protrusions 22 are received in the other ends of the respective spaces S, the protrusions 22 can effectively prevent rotation of the cutting tool.

In order to mount the cutting tool 30 in position in the tool holder A, in the same manner as the conventional arrangement, the tool holder A (chuck portion 2 and a portion of the grip portion 3 to be gripped by a manipulator) is thermally expanded by heating to radially expand the retaining bore 20.

When the tool holder A cools down thereafter, the cutting tool 30 is rigidly fitted in position in the tool holder A, with the protrusions 21 engaging the side edges of the groove 33 and the protrusions 22 received in ends of the spaces S such that the cutting tool 30 is positively prevented from being pulled out of the chuck portion 2 and also prevented from rotating relative to the chuck portion 2. This increases the gripping force.

To remove the cutting tool 30 from the tool holder A, the tool holder A is thermally expanded heating to radially expand the retaining hole 20, and then the cutting tool 30 is turned in the opposite direction to the direction in which the tool is turned to fit the tool in the tool holder, and pulled out.

The circumferential offset angle between the protrusions 21 and 22 has to be determined such that both of the protrusions 21 and 22 can smoothly pass through the spaces S while taking into consideration the size (radial dimension) of the spaces S. With the protrusions 22 received in the respective spaces S, when the cutting tool A is turned, the protrusions 22 are configured to be received in the corresponding ends of the spaces S, thus preventing rotation of the cutting tool A.

Figure 6:
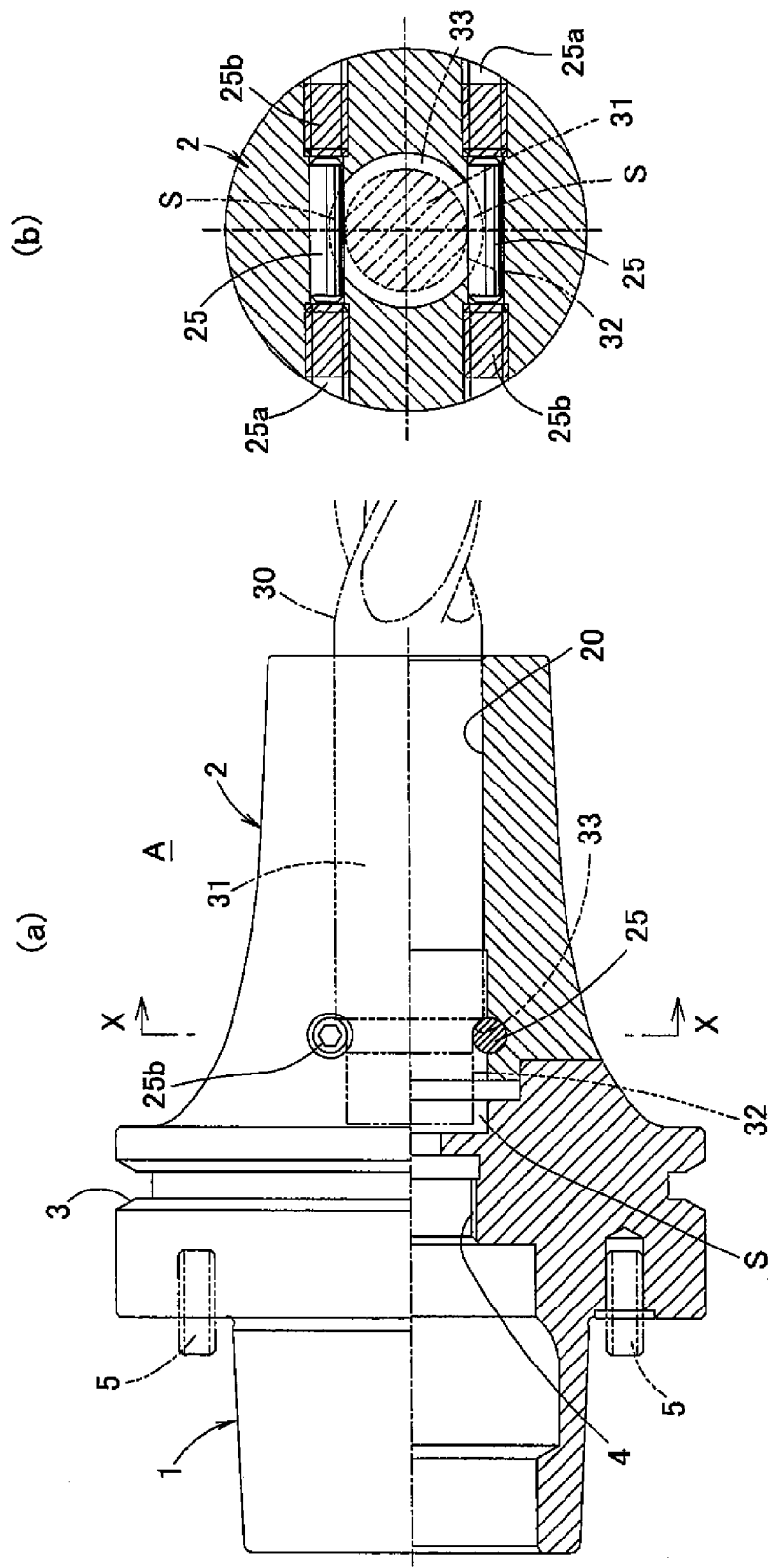
FIG. 6(*a*) is a partially cutaway front view of another embodiment.

FIG. 6 shows another embodiment, in which instead of the protrusions 21 and 22, pins 25 are provided on the inner wall of the retaining bore 20 so as to be symmetrical to each other with respect to the axis of the bore 20. The pins 25 are columnar members each inserted in a hole 25a extending through the chuck portion 2. Screws 25b are in threaded engagement in each hole 25a at both ends of the hole 25a to prevent the pin 25 from being pulled out of the hole 25a.

When the cutting tool 30 is inserted into the retaining bore 20 of the tool holder A (chuck portion 2), the pins 25 pass through the spaces S while sliding on the flat surfaces 32 and are received in the groove 33. When, thereafter, the cutting tool 30 is rotated, the pins 25 leave the flat surfaces 32 and are received in the groove 33, thus preventing the cutting tool 30 from being pulled out of the chuck portion 2.

The groove 33 may not extend the entire circumference but have circumferential ends. In this case, by bringing the pins 25 into abutment with the respective circumferential ends, the pins 25 ca prevent the cutting tool 30 not only from being pulled out of the chuck portion 2 but also from being rotating relative to the chuck portion 2. Also, even without the groove 33, the cutting tool 30 is prevented from rotating relative to the chuck portion 2 due to the engagement of the pins 25 with the flat surfaces 32, and the cutting tool 30 is also prevented from being pulled out of the chuck portion 2 because the pins 25 are received in the spaces S.

Further, in this embodiment, since the pins 25 are inserted into the holes 25a from the outer peripheral surface of the chuck portion 2, the pins 25 can be easily inserted into the holes 25a, so that the chuck portion 2 and the shank portion 1 need not be separate members but may form an integral body. The pins 25 may not be in the shape of circular columns provided they can slide on the flat surfaces 32. For example, the pins 25 may be in the shape of polygonal (such as square) columns.

In the embodiment of FIG. 1, even without the protrusions 21 and the groove 33, with the protrusions 22 received in the spaces between the inner wall of the retaining bore and the flat surfaces 32, the cutting tool 30 is not only prevented from rotating relative to the chuck portion 2 but prevented, to a certain extent, from being pulled out of the chuck portion 2.

Figure 7:
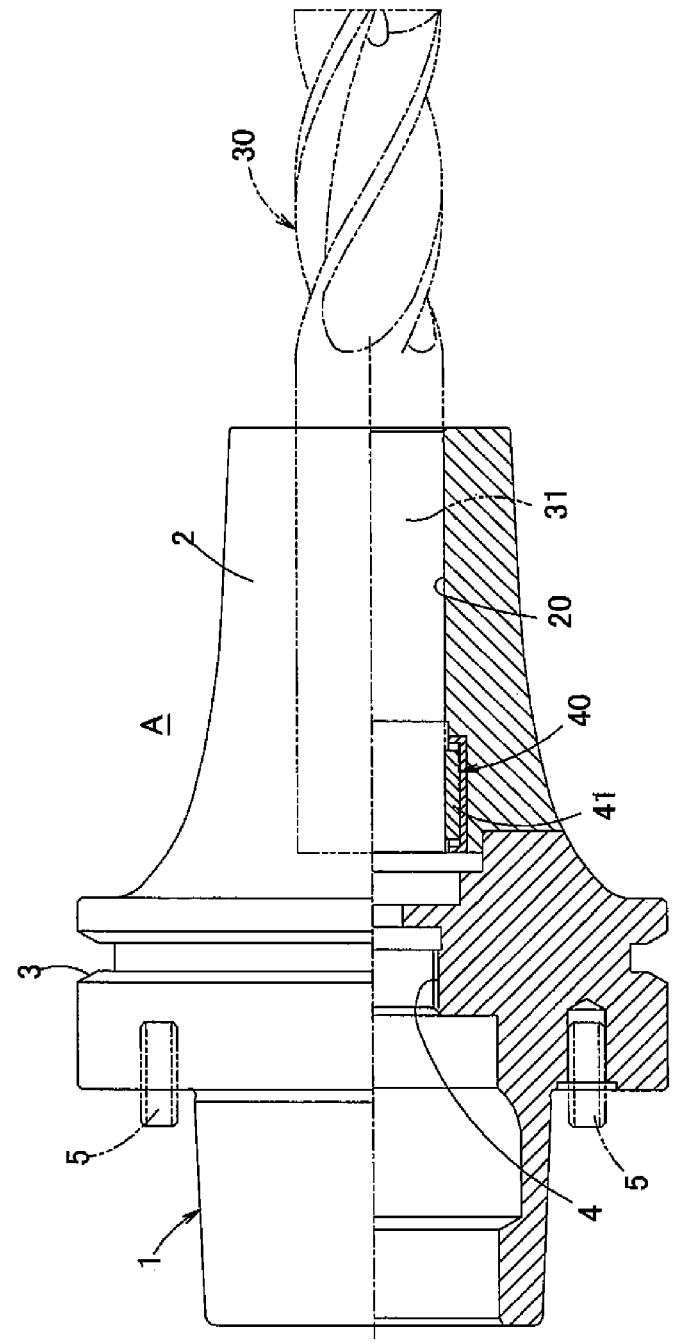
FIG. 7 is a partially cutaway front view of still another embodiment.

FIG. 7 shows still another embodiment, in which the tool holder A includes a one-way clutch 40 provided on the inner wall of the retaining bore 20 of the chuck portion 2 to prevent rotation of the cutting tool 30 in the cutting direction relative to the chuck portion 2. In this arrangement, when the cutting tool 30 is inserted into the retaining bore 20, rollers 41 of the one-way clutch 40 abut the outer peripheral surface of the insert portion 31 of the cutting tool 30. The one-way clutch 40 is configured to allow rotation of the cutting tool 30 relative to the tool holder A (chuck portion 2) in the direction opposite to the cutting direction, and prevent rotation of the cutting tool 30 relative to the chuck portion 2 due to engagement of rollers 41 between the retaining bore 20 and the cutting tool 30. The one-way clutch 40 may be a known one such as disclosed in Patent document 5 or 6.

In this embodiment, the one-way clutch 40 is fitted in an annular recess formed in the inner wall of the retaining bore 20. Since this recess can be formed easily, the chuck portion 2 and the shank portion 1 need not be separate members but may form an integral body.

In this embodiment, the above-mentioned flat surfaces 32 may be formed on the cutting tool 30 such that axially elongated protrusions half embedded in the inner wall of the retaining bore 20, such as the rollers 41, can be received in the spaces S defined by the flat surfaces 32, when the cutting tool 30 rotates, the protrusions are received in corresponding ends of the spaces S, thereby preventing rotation of the cutting tool.

Figure 8:
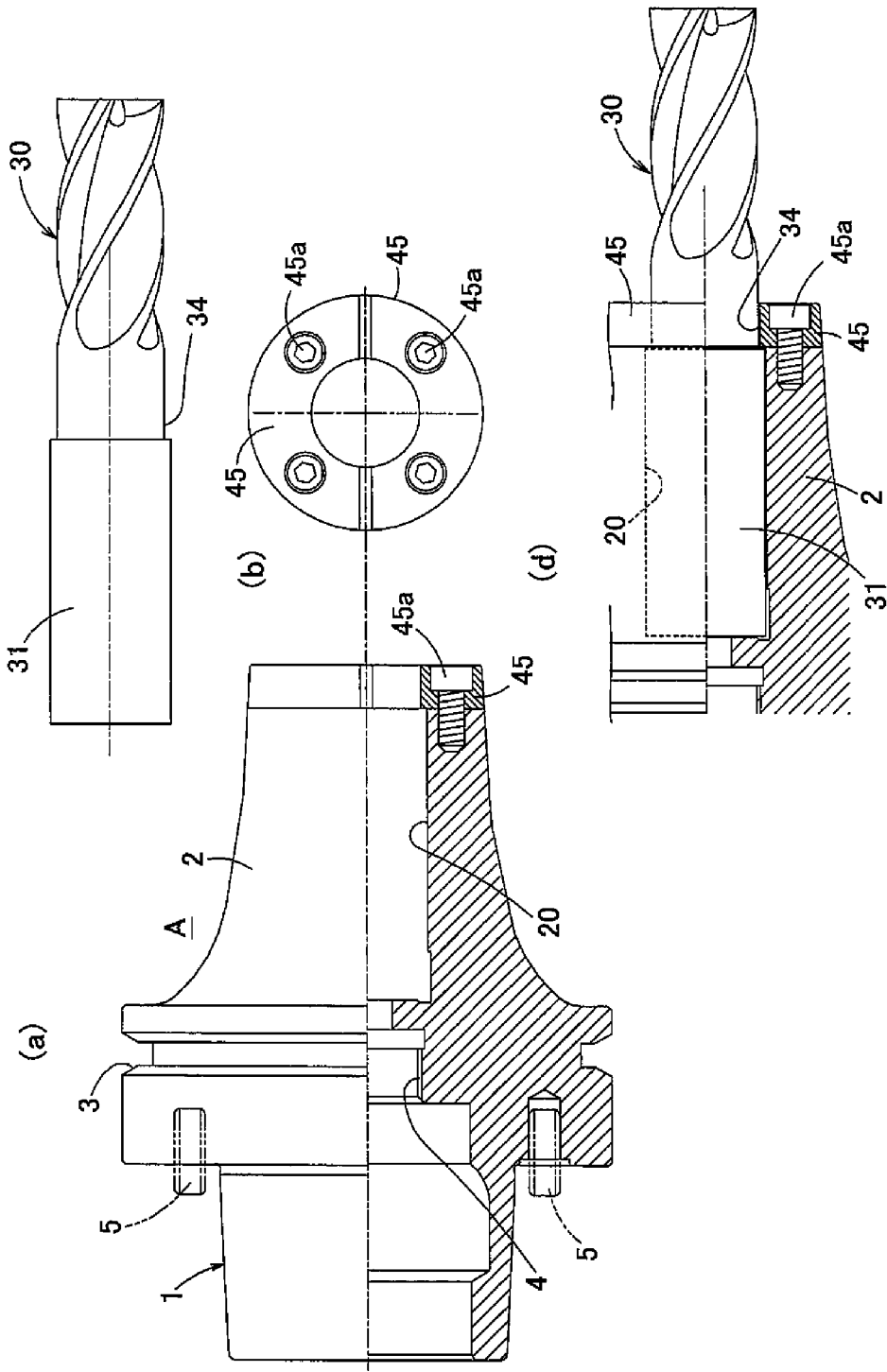
FIG. 8(*a*) is a partially cutaway front view of yet another embodiment.

FIGS. 8(*a*) to 8(*d*) show yet another embodiment, in which the tool holder A has none of the protrusions 21 and 22 and the flat surfaces 32 as used in the previous embodiments. Instead, a stopper 45 is screwed to the end surface of the chuck portion 2 from which the cutting tool is inserted into the retaining bore 20 so as to engage a groove 34 of the cutting tool 30.

The stopper 45 is shown to be composed of two split halves, but may be composed of more than two, such as three or four, split pieces. In any of such cases, the split pieces are preferably equal in size (weight) so that the tool holder can rotate in a balanced manner. In this case, some of the plurality of split pieces forming the stopper 45 may be omitted, and the remaining split pieces may be arranged circumferentially equidistantly spaced apart from each other. For example, two of the four split pieces forming the stopper 45 may be omitted, and the remaining two split pieces may be arranged circumferentially equidistantly spaced apart from each other.

In this embodiment, after fitting the cutting tool 30 in the retaining bore 20, by fixing the stopper 45 in position with screws, the stopper 45 is fitted in the groove (step) 34, as shown in FIG. 8(*d*). This prevents the cutting tool 30 from being pulled out of the chuck portion 2. The groove 34 may extend only a part of the entire circumference, for example, may be in the form of a flat surface 32, the stopper 45 also serves to prevent rotation of the cutting tool by abutting one of the circumferential ends of the groove 34. In this case, the bore of the stopper 45 (through which the cutting tool 30 is inserted) is shaped complementary to the groove 34 (such as a circular shape with its circumference partially removed).

Figure 9:
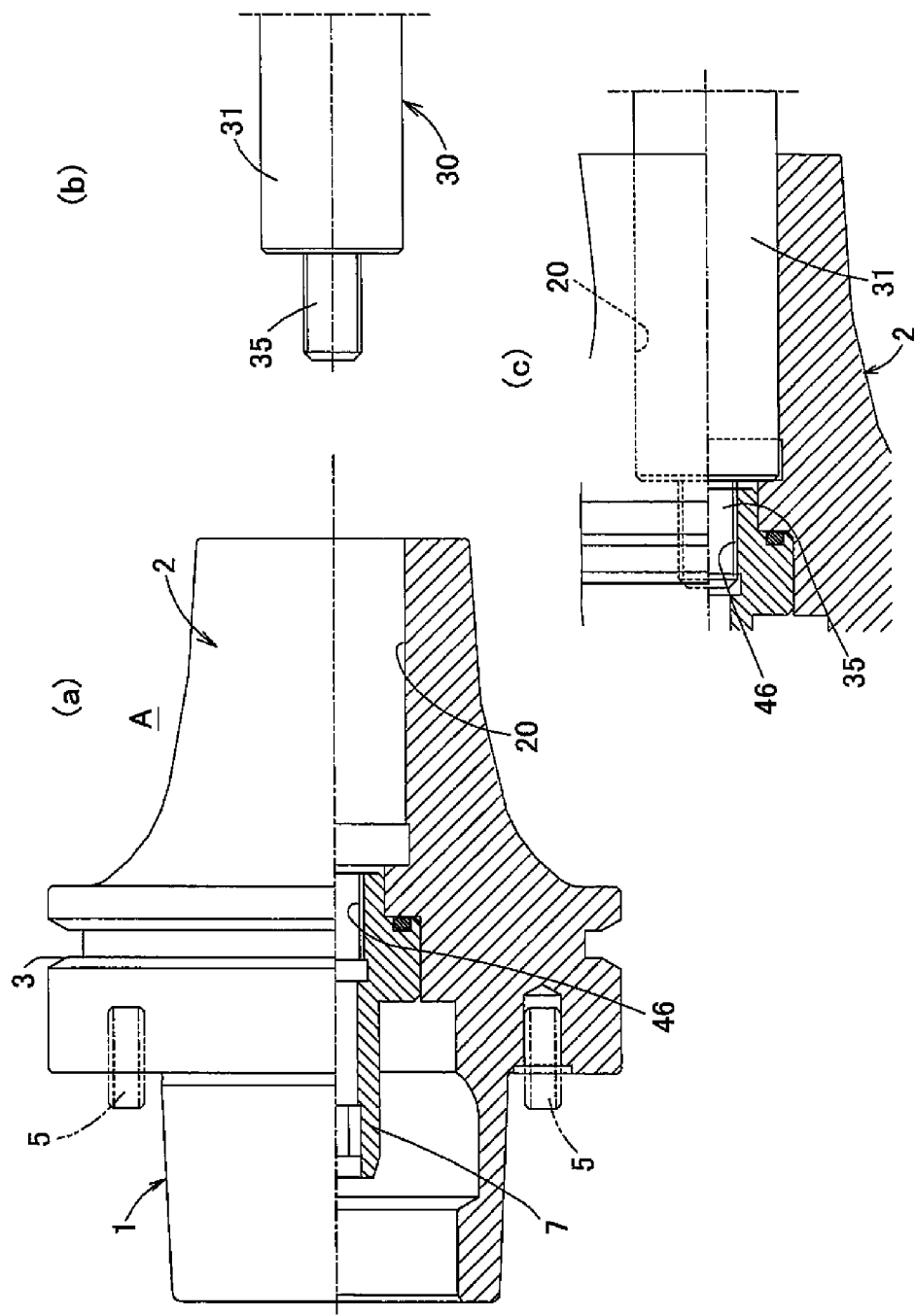
FIG. 9(a) is a partially cutaway front view of a further embodiment.
FIG. 9(b) is a partial front view of a cutting tool thereof.
FIG. 9(c) is a partial sectional view of a tool holder thereof, showing the state in which the cutting tool is mounted.
Figure 10:
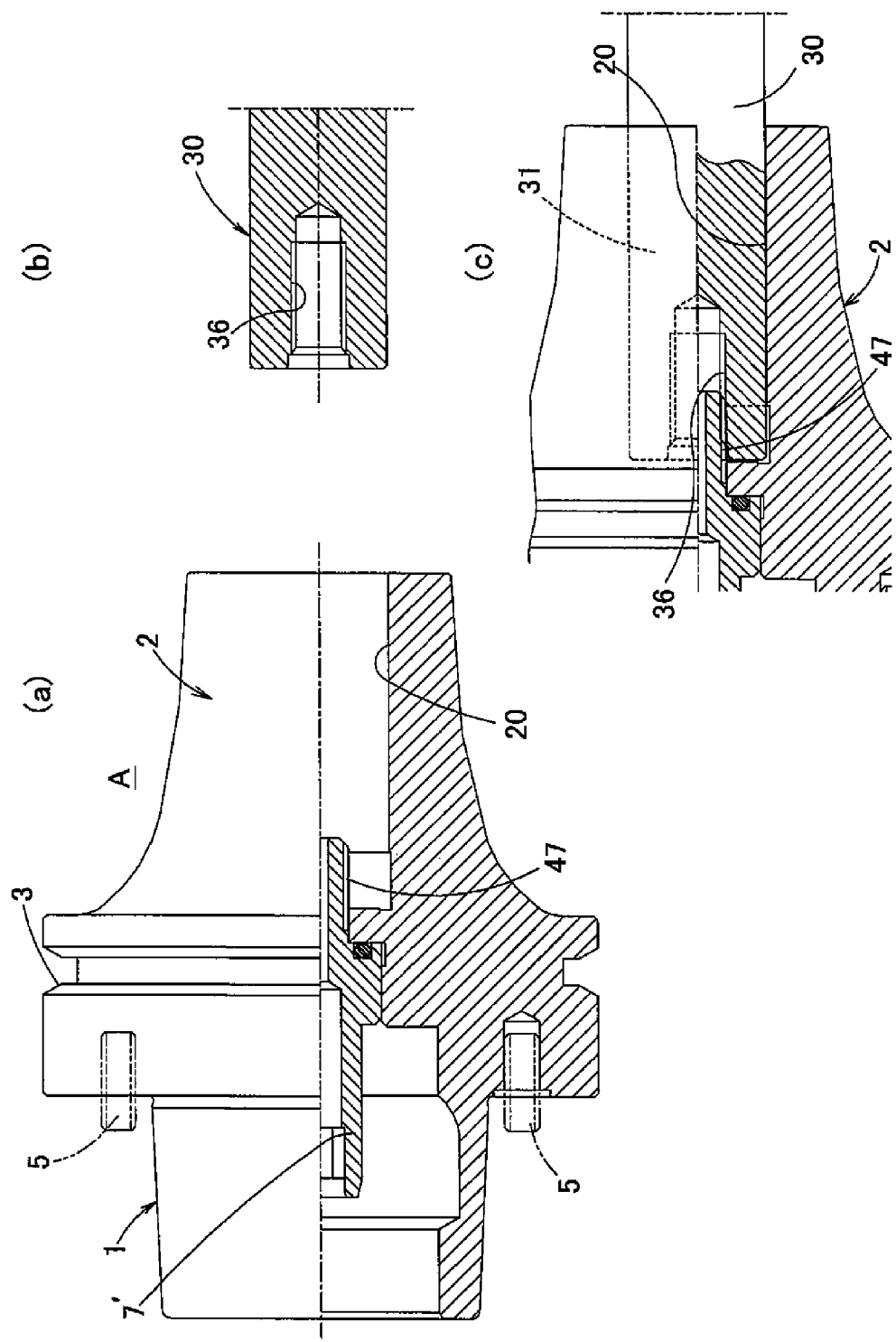
FIG. 10(a) is a partially cutaway front view of a still further embodiment.
FIG. 10(b) is a partially cutaway front view of a cutting tool thereof.
FIG. 10(c) is a partial sectional view of a tool holder thereof, showing the state in which the cutting tool is mounted.

FIGS. 9 and 10 show further embodiments, in which instead of the protrusions 21 and 22 and the flat surfaces 32, as used in the previous embodiments, the tool holder A has an internal thread 46 or an external thread 47 configured to be brought into threaded engagement with an external thread 35 or an internal thread 36, respectively, formed at the end of the cutting tool 30 from which the cutting tool is inserted into the tool holder. The internal thread 46 or the external thread 47 are formed on a coolant duct 7 or 7', which is an extension of the coolant duct 6 extended from the distal end of the coolant duct 6 into the retaining bore 20.

In these embodiments, as shown in FIGS. 9(*c*) and 10(*c*), when the cutting tool 30 is fitted in the retaining bore 20, by bringing the thread 35 or 36 into threaded engagement with the thread 46 or 47, the cutting tool 30 is prevented from being pulled out of the chuck portion 2. These threads are brought into threaded engagement with each other by threading the coolant duct 7 or 7' onto or into the shank of the cutting tool (shown in FIG. 1) after fitting the cutting tool 30 in the tool holder A by shrink fitting. If the threads are brought into engagement with each other by threading the coolant duct 7 or 7' in the direction opposite to the cutting direction, it is also possible to prevent rotation of the cutting tool.

Figure 11:
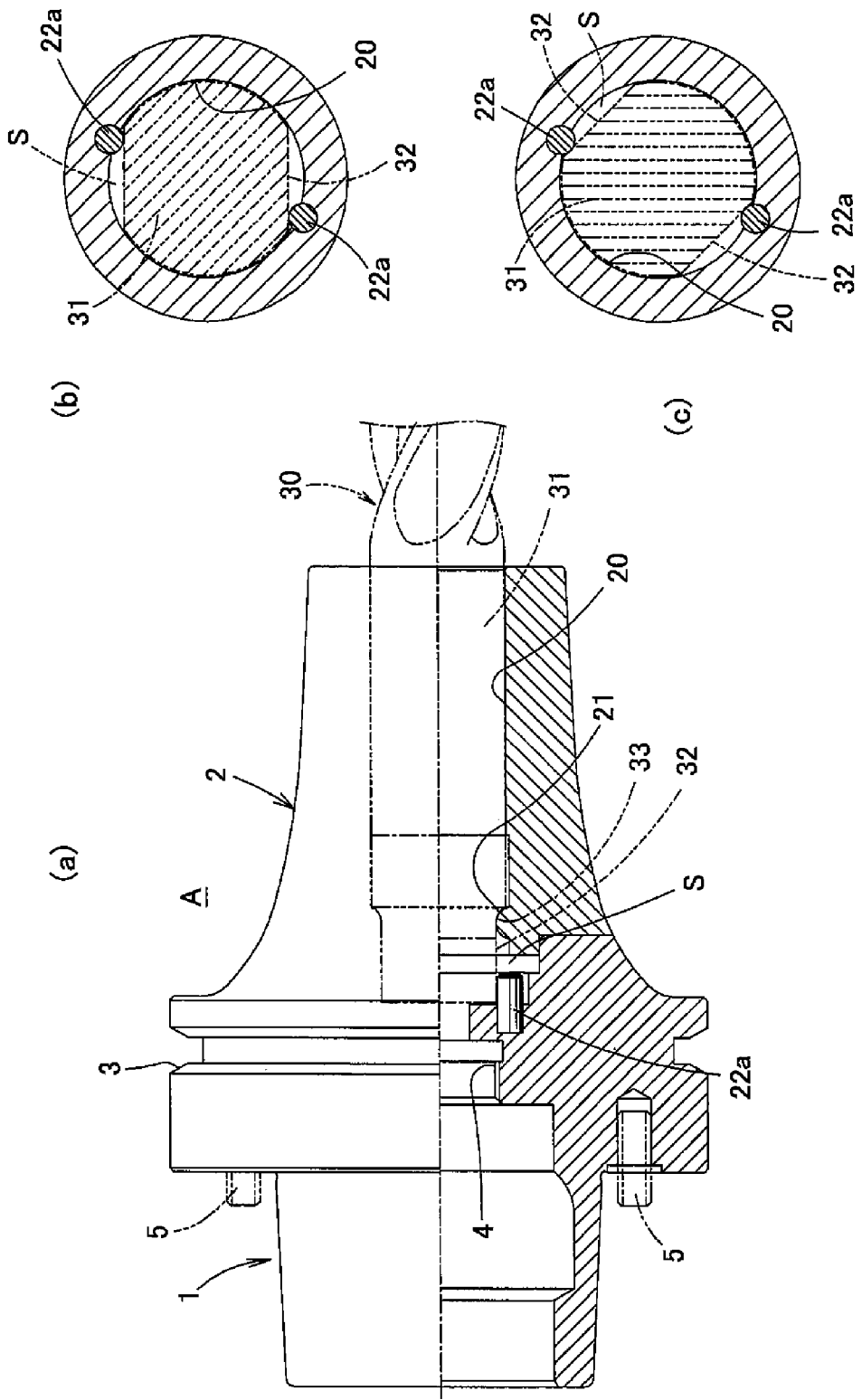
FIG. 11(a) is a partially cutaway front view of a yet further embodiment.
FIGS. 11(b) and 11(c) shows how this embodiment operates.

In any of the above embodiments, pins 22*a* may be used instead of the protrusions 22 to prevent rotation of the cutting tool. In particular, in the embodiment of FIG. 11, which is a modification of the embodiment of FIG. 1, pins 22*a* are provided at the same position as the protrusions 22 of the embodiment of FIG. 1, by threading, fitting or by any other suitable means, so as to protrude from the inner wall of the bore 20. With this arrangement, in the same manner as in the embodiment of FIG. 1, when the cutting tool 30 is inserted into the retaining bore 20 of the chuck portion 2 (tool holder A), with the flat surfaces 32 corresponding in position to the protrusions 21 and the pins 22*a*, until the end surface of the insert portion of the cutting tool abuts the inner wall of the retaining bore 20, and the cutting tool 30 is turned, the protrusions 21 move in the groove 33 and engage the side edges of the groove 33, thus preventing the cutting tool 30 from being pulled out of the chuck portion 2 (retaining bore 20). Simultaneously, the pins 22*a* move in the spaces S and are received in corresponding ends of the spaces S (from FIGS. 11(*b*) to 11(*c*)), thus preventing rotation of the cutting tool 30 relative to the chuck portion 2.

Figure 12:
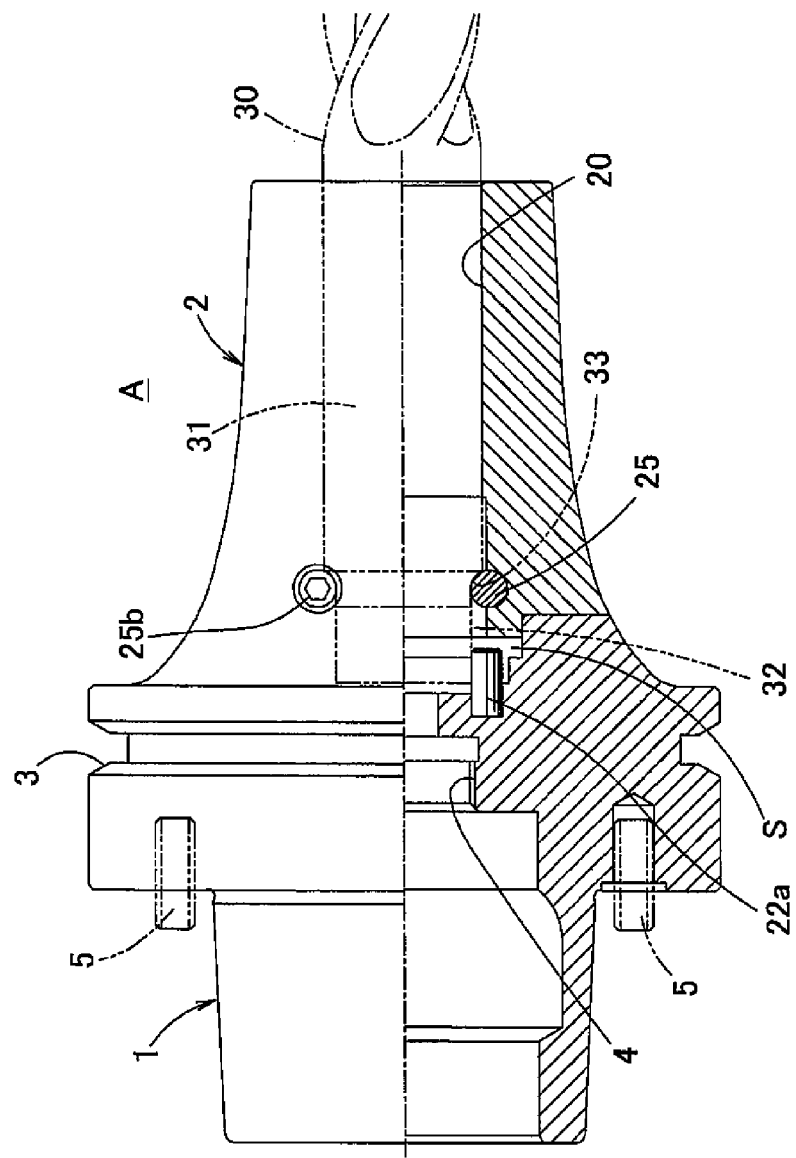
FIG. 12 is a partially cutaway front view of still another embodiment.
Figure 13:
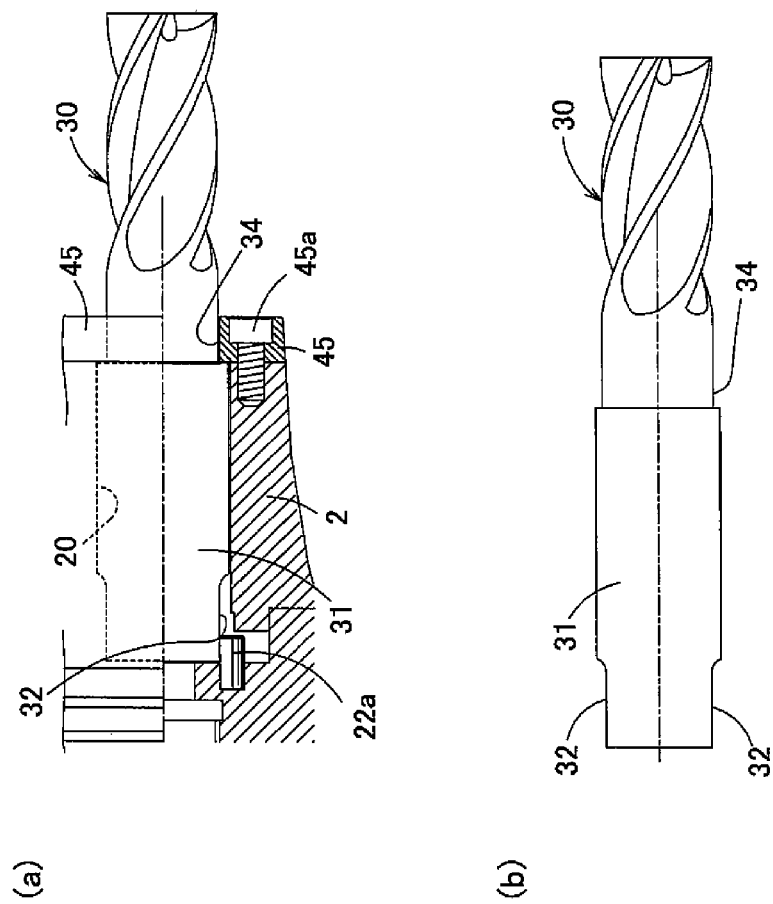
FIG. 13(a) is a partial sectional front view of still another embodiment.
FIG. 13(b) is a front view of a cutting tool thereof.
Figure 14:
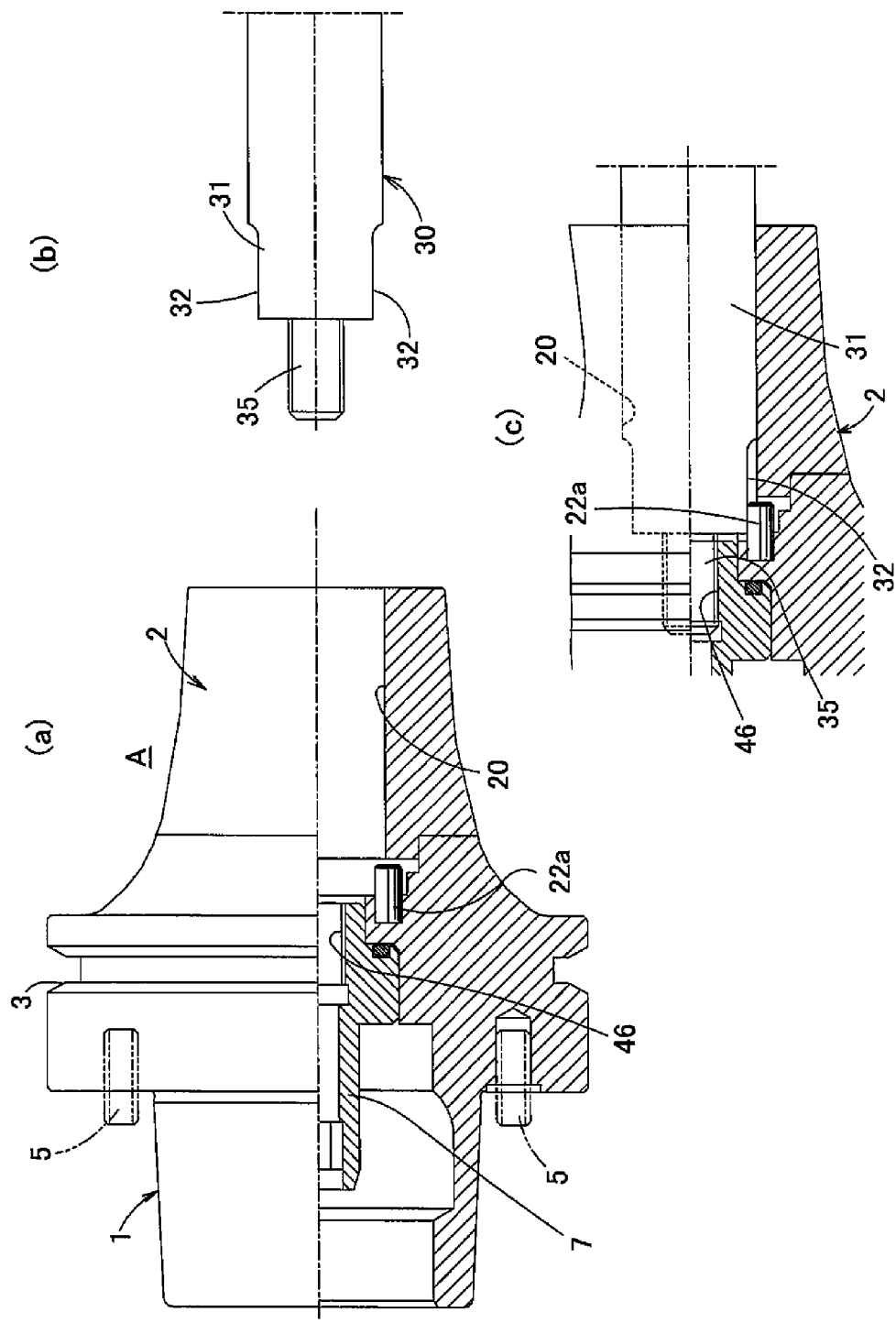
FIG. 14(a) is a partially cutaway front view of a tool holder of a still further embodiment.
FIG. 14(b) is a partial front view of a cutting tool thereof.
FIG. 14(c) is a partial sectional front view of the tool holder thereof, showing the state in which the cutting tool is mounted.
Figure 15:
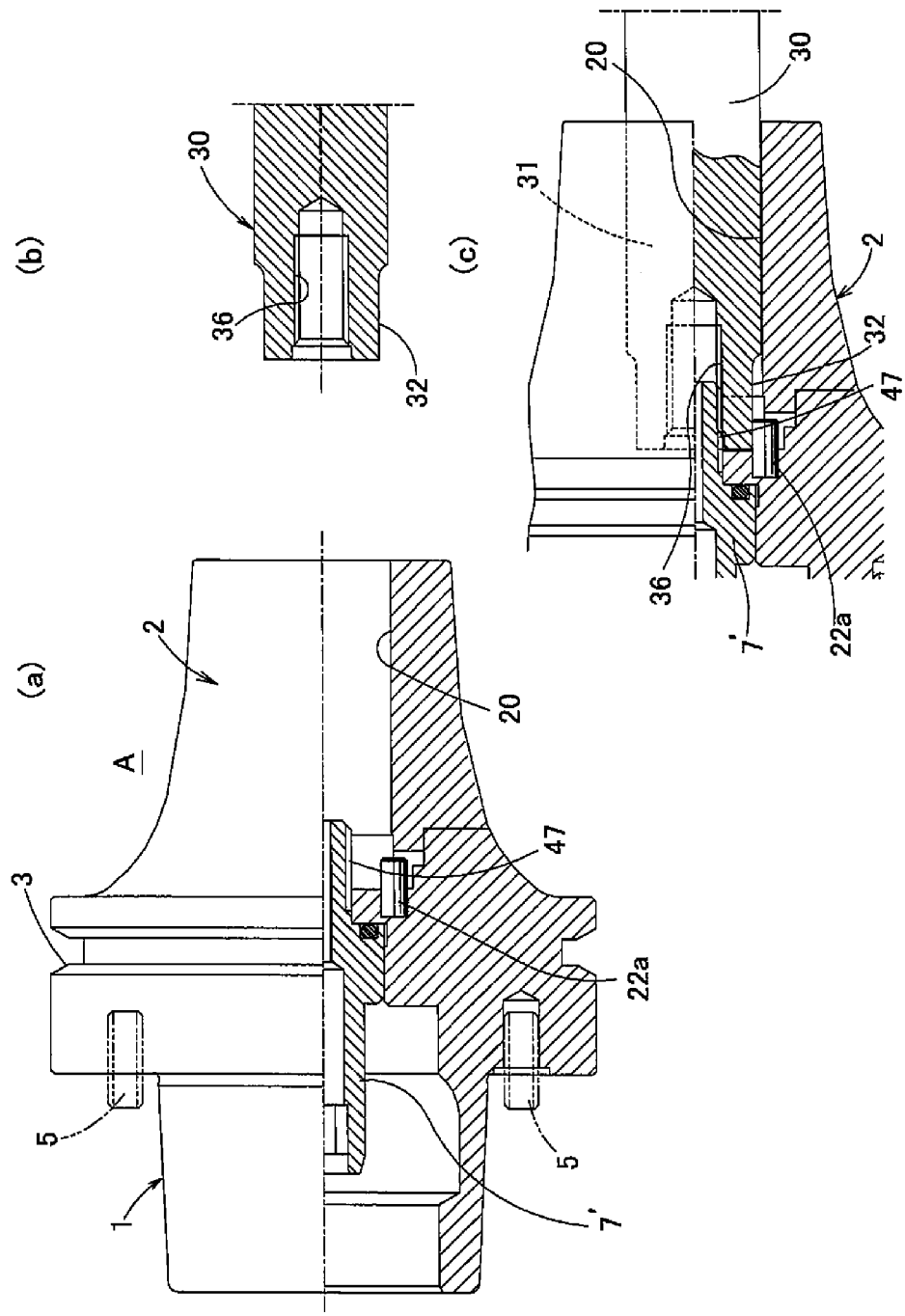
FIG. 15(a) is a partially cutaway front view of a tool holder of a still further embodiment.
FIG. 15(b) is a partial sectional front view of a cutting tool thereof.
FIG. 15(c) is a partial sectional front view of the tool holder thereof, showing the state in which the cutting tool is mounted.

In the embodiments of FIGS. 6, 8, 9 and 10, too, the pins 22*a* may be provided on the fitting surface of the integral shank body including the shank portion 1 so as to protrude from the fitting surface, as shown in FIGS. 12, 13, 14 and 15, respectively, to prevent rotation of the cutting tool in the same manner as above. In the embodiment of FIG. 12, the cutting tool 30 is the one shown in FIG. 3 and thus has the flat surfaces 32 and the groove 33. In the embodiment of FIG. 13, the cutting tool 30 has flat surfaces 32 shown in FIG. 13(*b*). In the embodiments of FIGS. 14 and 15, the cutting tool 30 has flat surfaces 32 shown in either of FIGS. 14(*b*) and 15(*b*).

In the embodiment of FIG. 13, after inserting the cutting tool 30 into the retaining bore 20 of the chuck portion 2, and turning the cutting tool 30 until the pins 22*a* are received in corresponding ends of the spaces between the inner wall of the retaining bore 20 and the flat surfaces 32, the cutting tool 30 may be fixed to the chuck portion 2 by shrink fitting, and then the stopper 45 may be mounted. Alternatively, after the pins 22*a* have been received in ends of the above spaces, the stopper 45 may be mounted and then cutting tool 30 may be fixed to the chuck portion 2 by shrink fitting.

Figure 3:
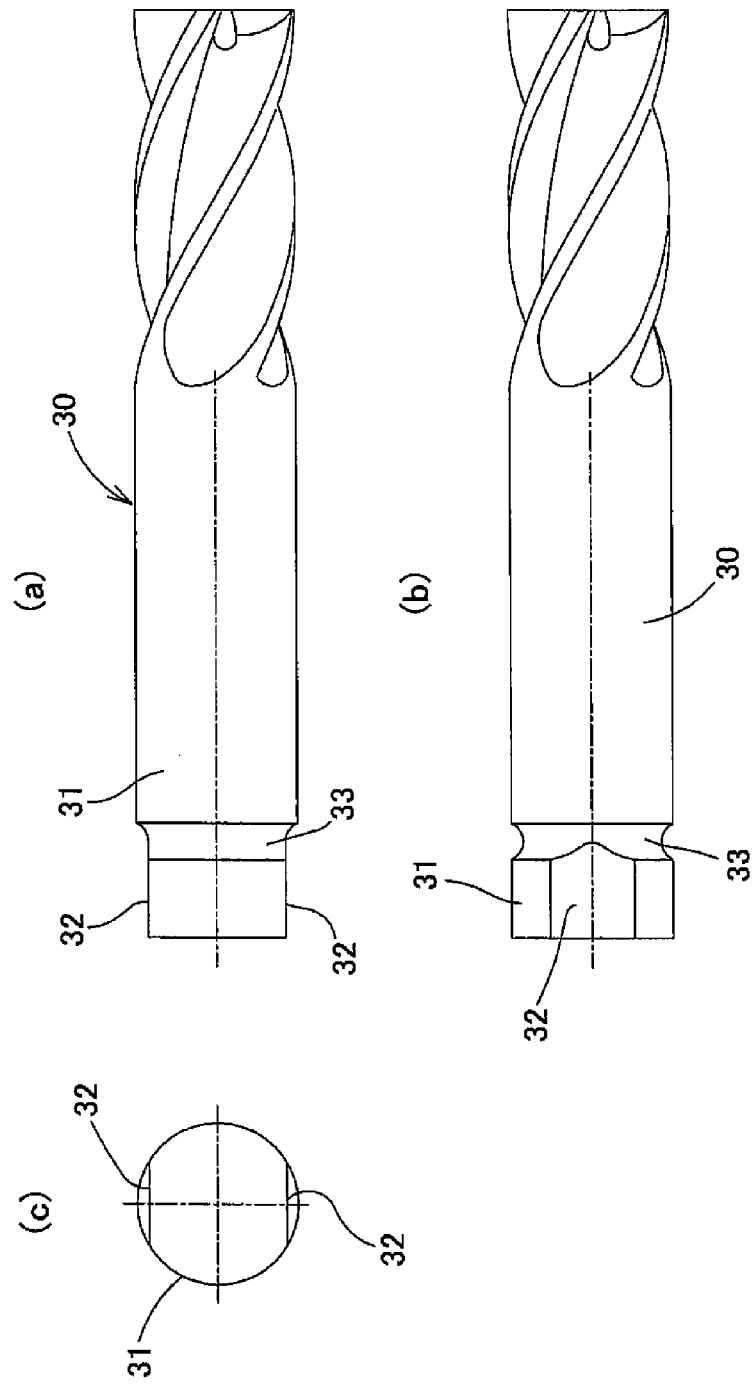
FIG. 3(*a*) is a front view of a cutting tool fitted in a tool holder of the embodiment of FIG. 1.
Figure 16:
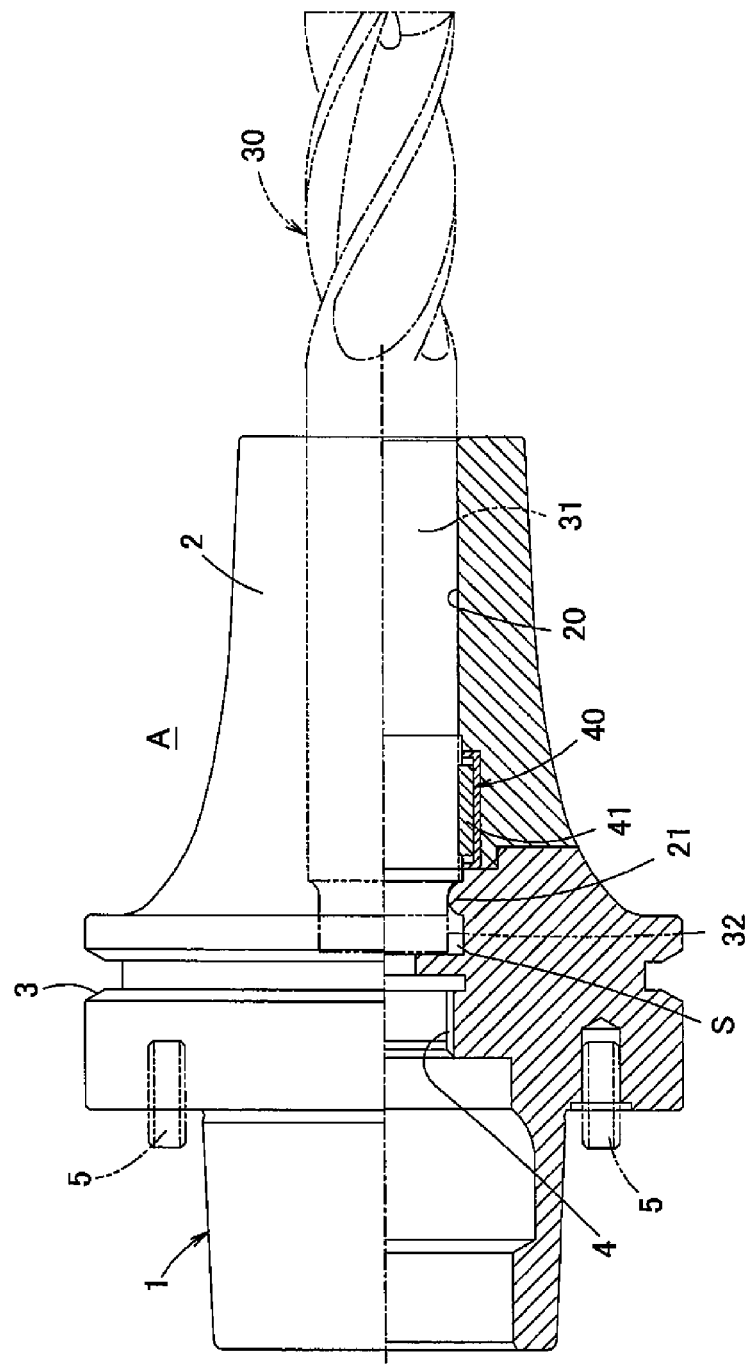
FIG. 16 is a partially cutaway front view of still another embodiment.

In the embodiment of FIG. 7, as shown in FIG. 16, if the protrusions 21 is formed on the integral shank body including the shank portion 1, and as the cutting tool 30, the one shown in FIG. 3, which has the flat surfaces 32 and the groove 33, is used, it is possible to prevent the cutting tool from being pulled out of the tool holder in the same manner as above. In this arrangement, the protrusions 21 may be replaced by the pins 25 shown in FIG. 6.

Further, in order to prevent the cutting tool 30 from being pulled out of the tool holder, as shown in FIG. 17, pins 21a may be screwed into the chuck portion from its outer peripheral surface as shown, similar to conventional side locking functions. As shown in FIGS. 17(b) and 17(c), the cutting tool 30 is formed with flat surfaces 32a which the distal ends of the pins 21a are configured to abut. In this embodiment, the pins 22s, shown, may be used to prevent rotation of the cutting tool, or protrusions 22 or 22a may be used instead for this purpose.

The shank portion 1 may not be of the HSK type as in the above embodiments, but may be of any other type such as the BT type as shown in FIG. 17. As also shown in FIG. 17, the anti-rotation protrusions 22 may be formed on the inner wall of the portion of the retaining bore 20 formed in the chuck portion 2.

The cross-sectional shape of the groove 33 is not limited to a circular arc but may be e.g. a triangle as shown in FIG. 19(a) or a trapezoid as shown in FIG. 19(b). The sectional shape of the protrusions 21, which is adapted to engage in the groove 33, and the sectional shape of the protrusions 22, which are received in ends of the spaces S, are not limited, provided the protrusions 21 can be snugly fitted in the groove 33 such that the protrusions 21 are movable only in the length direction of the groove and not movable in the width direction of the groove 33 (axial direction of the cutting tool 30).

Figure 20:
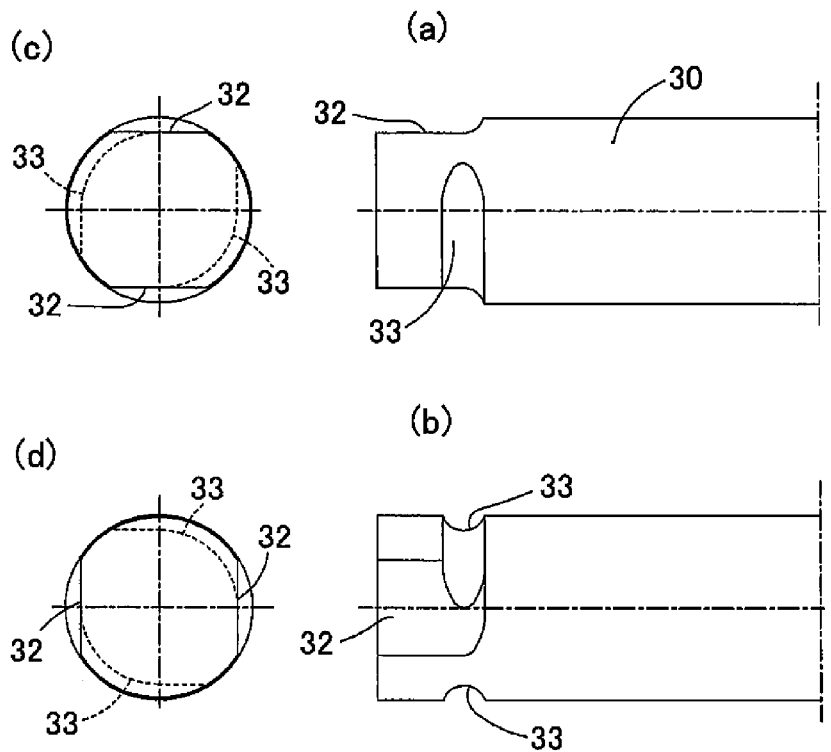
FIG. 20(a) is a front view of a different cutting tool which can be fitted in the tool holder of any of the above embodiments.
FIG. 20(b) is a plan view thereof.
FIG. 20(c) is a left-hand side view of FIG. 20(a)
FIG. 20(d) is a left-hand side view of FIG. 20(b).
Figure 21:
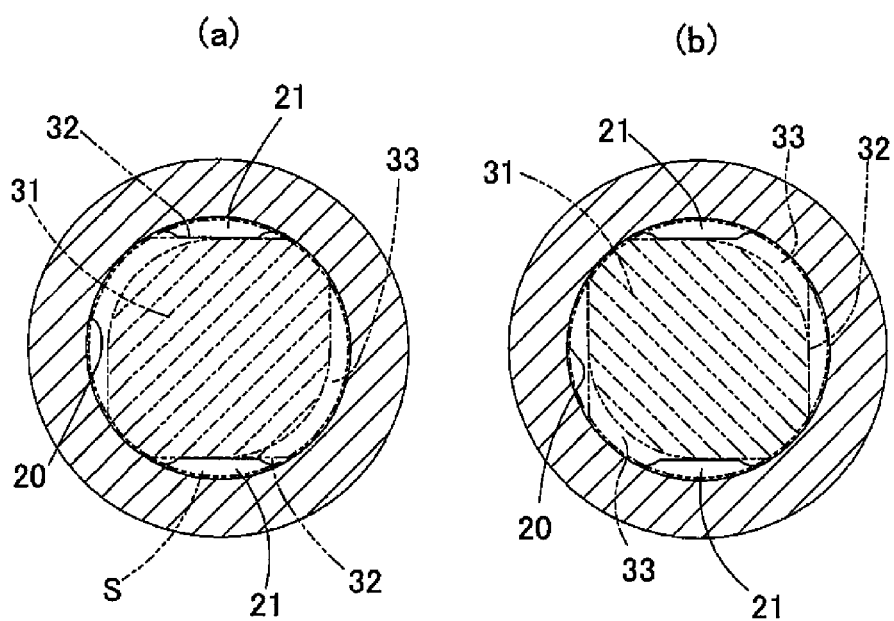

The groove 33 may not extend the entire circumference but may extend only up to an intermediate point in the direction opposite to the cutting direction as shown in FIG. 20. With this arrangement, when one of the protrusions 21 engages the end of the groove 33, rotation of the cutting tool is stopped. This eliminates the necessity of the anti-rotation protrusions 22. In this arrangement, if the groove 33 has e.g. a circular arc or triangular cross-section and is designed such that its depth and width gradually decrease toward its end, when the cutting tool 30 is inserted in the retaining bore 20 of the chuck portion 2 and is turned in the cutting direction, from the state of FIG. 21(a) to the state of FIG. 21(b), one of the protrusions 21 is more tightly pressed against the inner wall of the groove as it moves toward the end of the groove 33, thus effectively preventing rattling of the cutting tool 30. But even if the depth and width of the groove 33 is constant up to its end, this arrangement can still prevent the cutting tool from being pulled out or from rotating.

It has been confirmed that while heavy cutting is performed with large bending force applied to the cutting tool 30, slippage occurs in the cutting direction between the columnar insert portion of the cutting tool 30 and the cylindrical retaining hole 20 of the chuck portion 2, which is gripping the cutting tool 30. If it is known that the tool system is used in such heavy cutting, the anti-rotation protrusions 22, 22a may be moved forwardly with respect to the cutting direction. For example, the anti-rotation protrusions 22 of FIG. 4 may be positioned such that cutting is performed with the protrusions 22 received between the inner wall of the retaining bore 20 and the flat surfaces 32. If the one-way clutch 40 is used, it is positioned to prevent rotation in the cutting direction.

The tool holder according to the present invention is used not only in 5-axis control, but also in 2-axis control, 3-axis control, 5-axis control, or more than 5-axis control.

The above embodiments are mere examples in every respect, and the present invention is not limited to these embodiments. Rather, it should be understand that the present invention is interpreted as covering what is shown by claims and any equivalents of the claimed elements.

DESCRIPTION OF THE NUMERALS

1. Shank portion
2. Chuck portion
3. Grip portion (to be gripped by a manipulator)
20. Cutting tool retaining bore of the chuck portion
21, 25. Anti-pull-out protrusion
22, 22a. Anti-rotation protrusion
30. Cutting tool
31. Insert portion of the cutting tool (to be inserted into the retaining bore)
32. Flat surface
33. Circumferential groove
34. Anti-pull-out groove
35. External thread
36. Internal thread
40. One-way clutch
41. Rollers of the one-way clutch
45. Anti-pull-out stopper
46. Internal thread
47. External thread
A. Tool holder
S. Space

What is claimed is:

1. A shrink fit tool holder comprising a shank portion which can be detachably mounted to a machine tool, and a chuck portion configured to hold a cutting tool by shrink fitting and formed with a cylindrical retaining bore, wherein the cutting tool comprises a columnar insert portion which can be inserted into the retaining bore and has an outer peripheral surface formed with a flat surface lying on a plane extending in an axial direction of the cutting tool, and extending from a distal end of the insert portion of the cutting tool, and with a groove continuous with the flat surface and extending in a circumferential direction of the cutting tool, wherein an anti-pull-out protrusion and an anti-rotation protrusion are provided on an inner wall of the retaining bore with the anti-pull-out protrusion spaced from the anti-rotation protrusion in the axial direction of the cutting tool, wherein the tool holder is configured such that when the cutting tool is inserted into the retaining bore, the anti-pull-out protrusion can pass through a space defined between the flat surface and the inner wall of the retaining bore and can be received in the groove, and when, thereafter, the cutting tool is turned about an axis of the cutting tool relative to the chuck portion, the anti-pull-out protrusion moves in a length direction of the groove until the anti-pull-out protrusion engages side edges of the groove, thereby preventing the cutting tool from being pulled out of the chuck portion, and wherein the tool holder is further configured such that when the anti-pull-out protrusion is received in the groove, the anti-rotation protrusion is located in the space, and when, thereafter, the cutting tool is turned about the axis of the cutting tool relative to the chuck portion, the anti-rotation protrusion is received between the flat surface and the inner wall of the retaining bore at one end of the space, thereby preventing rotation of the cutting tool relative to the chuck portion.

2. The shrink fit tool holder of claim 1, wherein the anti-rotation protrusion has a triangular section along a plane perpendicular to the axial direction of the cutting tool such that an apex of the triangular section is directed at the axis of the cutting tool.

3. The shrink fit tool holder of any of claim 2, wherein the tool holder is split into two bodies between the anti-pull-out protrusion and the anti-rotation protrusion; or at a position closer to the shank portion than the anti-pull-out protrusion, and wherein the two bodies are joined together.

4. The shrink fit tool holder of any of claim 1, wherein the tool holder is split into two bodies between the anti-pull-out protrusion and the anti-rotation protrusion; or at a position closer to the shank portion than the anti-pull-out protrusion, and wherein the two bodies are joined together.

* * * * *